(12) United States Patent
Yamamoto et al.

(10) Patent No.: US 7,477,586 B2
(45) Date of Patent: Jan. 13, 2009

(54) OPTICAL DISK APPARATUS FOR DISTINGUISHING RECORDING MEDIA INCLUDING SINGLE-LAYER AND DOUBLE-LAYER H-L MEDIA AND L-H MEDIUM

(75) Inventors: Ryosuke Yamamoto, Yokohama (JP); Sumio Ashida, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 763 days.

(21) Appl. No.: 11/018,152

(22) Filed: Dec. 22, 2004

(65) Prior Publication Data

US 2005/0141379 A1 Jun. 30, 2005

(30) Foreign Application Priority Data

Dec. 25, 2003 (JP) .............................. 2003-431437

(51) Int. Cl.
*G11B 7/004* (2006.01)
(52) U.S. Cl. .................................. 369/53.37; 369/53.45
(58) Field of Classification Search .................... None
See application file for complete search history.

(56) References Cited

U.S. PATENT DOCUMENTS

| | | | | |
|---|---|---|---|---|
| 5,467,329 | A * | 11/1995 | Hashimoto | 369/47.3 |
| 5,544,130 | A * | 8/1996 | Mizuno et al. | 369/1 |
| 5,544,137 | A * | 8/1996 | Ohara et al. | 369/47.5 |
| 5,592,448 | A | 1/1997 | Suzuki et al. | |
| 5,745,461 | A * | 4/1998 | Kawasaki | 369/53.23 |
| 5,903,531 | A * | 5/1999 | Satoh et al. | 369/44.29 |
| 5,940,353 | A * | 8/1999 | Tani | 369/30.04 |
| 6,072,758 | A | 6/2000 | Tajiri | |
| 6,278,672 | B1 * | 8/2001 | Kobayashi | 369/53.23 |
| 6,330,215 | B1 * | 12/2001 | Lim | 369/53.2 |
| 6,608,804 | B2 * | 8/2003 | Shim | 369/53.22 |

(Continued)

FOREIGN PATENT DOCUMENTS

EP 0 582 996 A1 2/1994

(Continued)

OTHER PUBLICATIONS

"80 mm (1,46 Gbytes per side) and 120 mm (4,70 Gbytes per side) DVD Re-recordable Disk (DVD-RW)", Standard ECMA, vol. 388, XP-007900926, Dec. 2002, pp. I-VI, 1-148.

*Primary Examiner*—Michael V Battaglia
(74) *Attorney, Agent, or Firm*—Oblon, Spivak, McClelland, Maier & Neustadt, P.C.

(57) ABSTRACT

The present invention provides an optical disk apparatus in which a first, second, third, and fourth optical disks are selectively installed, the first and second optical disks having different recording film characteristics and both having a single-layer recording layer, the third and fourth optical disks having different recording film characteristics and both having a double-layer recording layer. A control section determines which of the first to fourth optical disks has been installed, on the basis of the level of a reproduction signal from an optical head. Recording media serving as the optical disks are formed so that the light reflectances of a single-layer L-H medium in an initialized state, an L0 layer of a double-layer H-L medium in the initialized state, and an L0 layer of a double-layer L-H medium in an uninitialized state do not overlap the light reflectance of a single-layer H-L medium in the initialized state.

16 Claims, 17 Drawing Sheets

U.S. PATENT DOCUMENTS

| | | | |
|---|---|---|---|
| 6,628,591 B1 * | 9/2003 | Yokota et al. | 369/53.21 |
| 2002/0018408 A1 | 2/2002 | Yamada et al. | |
| 2003/0123356 A1 * | 7/2003 | Nonaka | 369/53.2 |
| 2004/0085877 A1 * | 5/2004 | Lee et al. | 369/53.37 |
| 2005/0105459 A1 * | 5/2005 | Tamura et al. | 369/275.4 |
| 2005/0128917 A1 * | 6/2005 | Ogawa et al. | 369/59.23 |

FOREIGN PATENT DOCUMENTS

| | | |
|---|---|---|
| EP | 0 971 345 A1 | 1/2000 |
| EP | 1 028 421 A2 | 8/2000 |
| EP | 1 293 974 A1 | 3/2003 |
| EP | 1 517 323 A2 | 3/2005 |
| JP | 8-321129 | 12/1996 |
| JP | 10-302381 | 11/1998 |
| JP | 2000-311427 | 11/2000 |
| JP | 2001-266367 | 9/2001 |
| JP | 2001-307416 | 11/2001 |
| TW | 1220512 | 8/2004 |

* cited by examiner

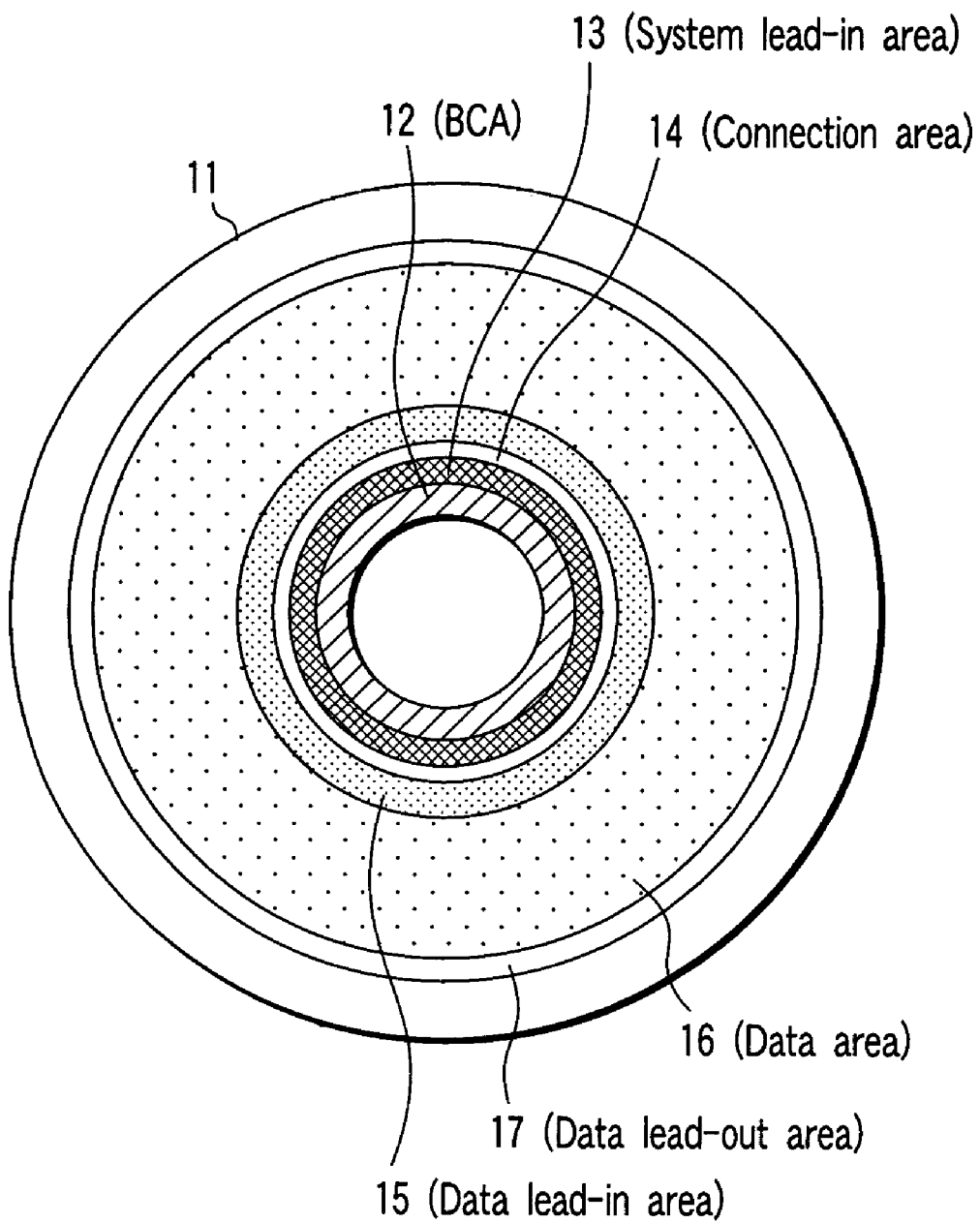
F I G. 1

| Information data in BCA-Data field | b7 | b6 | b5 | b4 | b3 | b2 | b1 | b0 |
|---|---|---|---|---|---|---|---|---|
| $I_8$ | \multicolumn{4}{c}{Book type} | \multicolumn{4}{c}{Part version} | | | | |
| $I_9$ | \multicolumn{8}{c}{reserved} | | | | | | | |
| $I_{10}$ | \multicolumn{8}{c}{reserved} | | | | | | | |
| $I_{11}$ | \multicolumn{8}{c}{reserved} | | | | | | | |

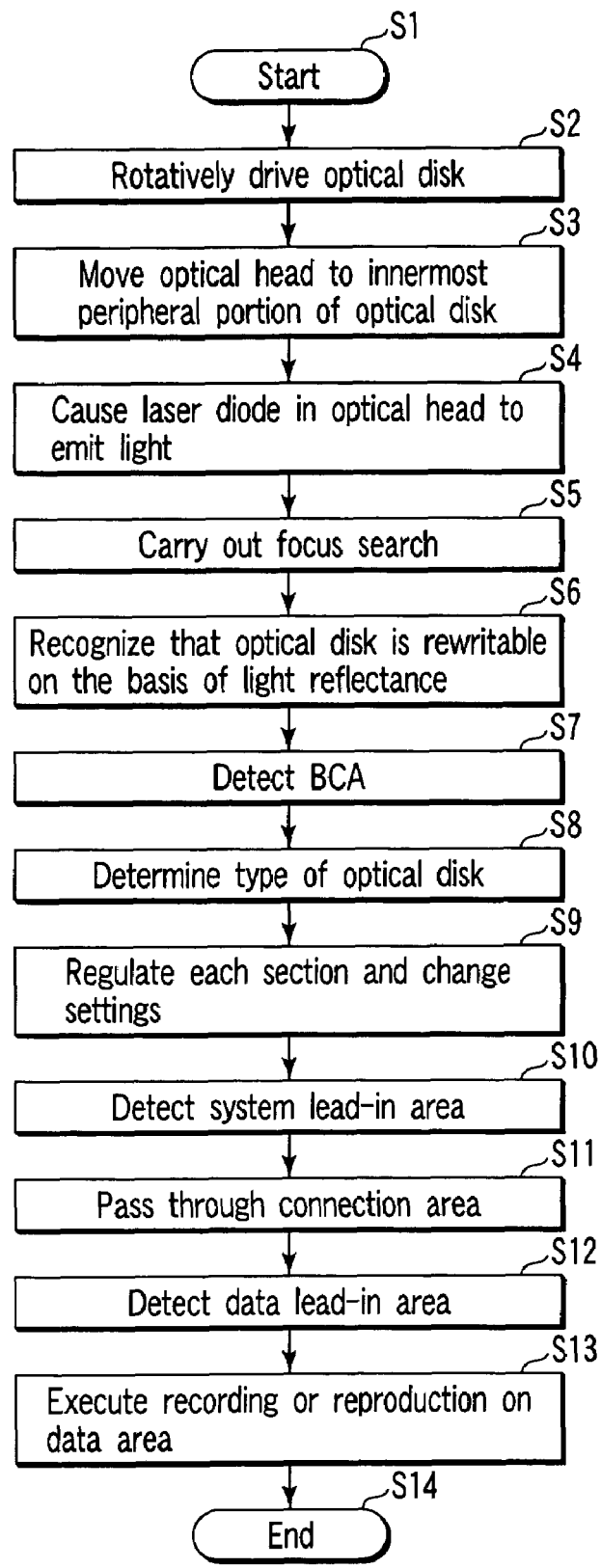
F I G. 6

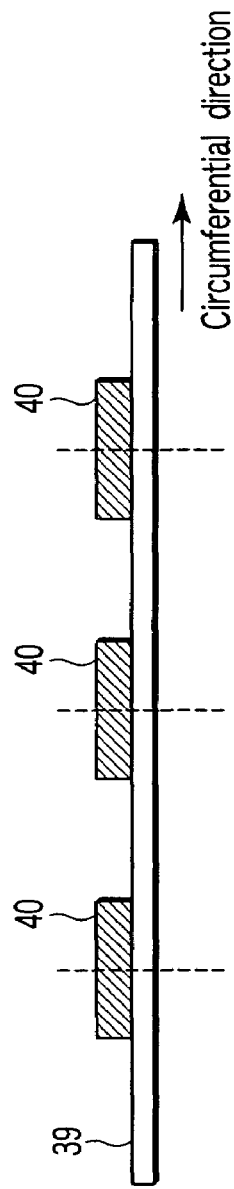
F I G. 7A
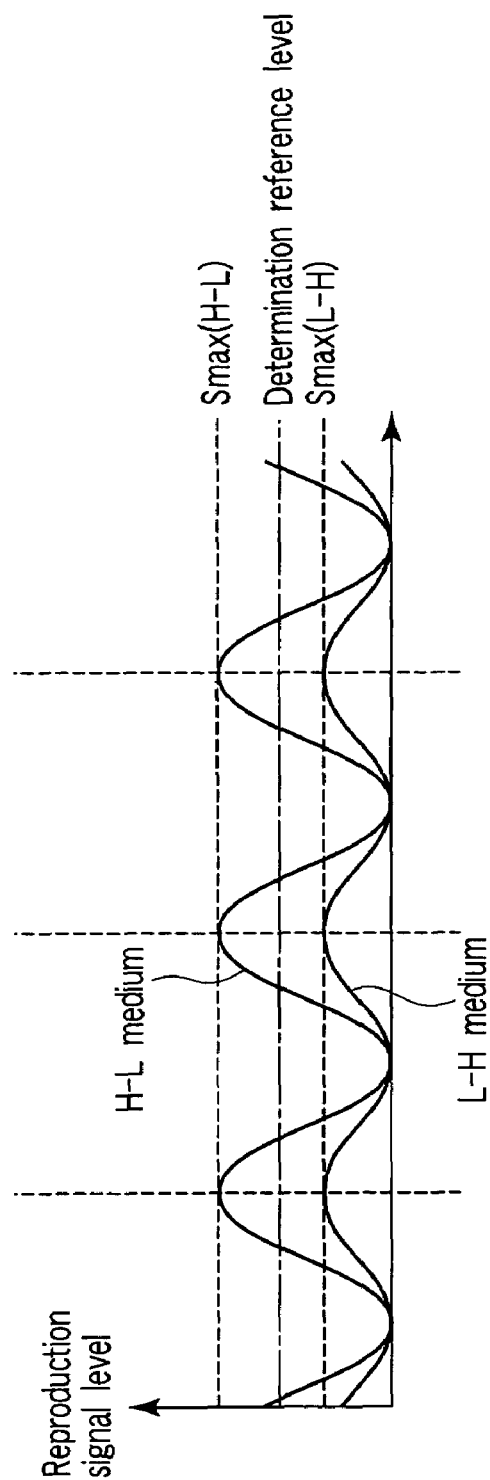
F I G. 7B

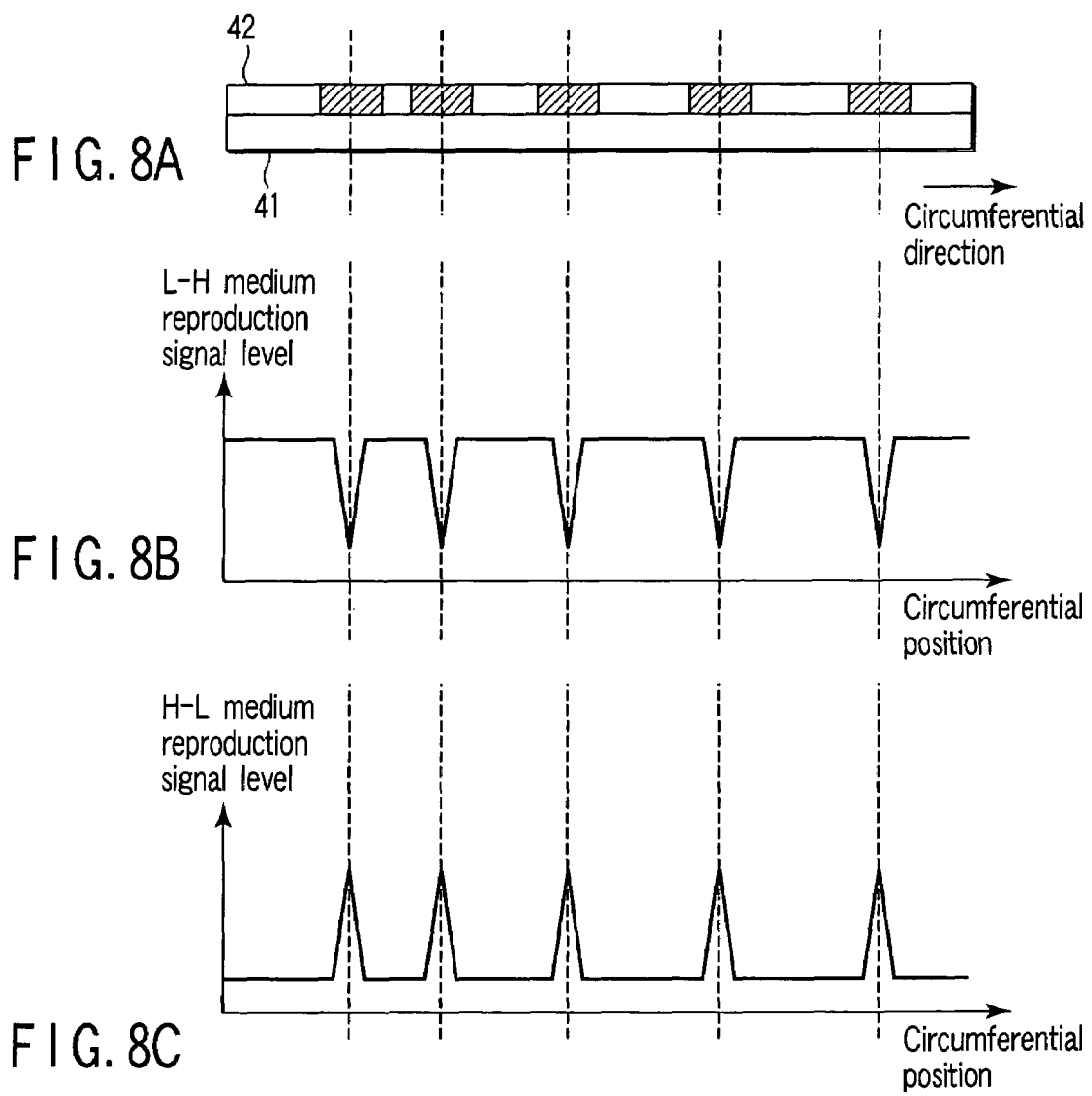

OPTICAL DISK APPARATUS FOR DISTINGUISHING RECORDING MEDIA INCLUDING SINGLE-LAYER AND DOUBLE-LAYER H-L MEDIA AND L-H MEDIUM

CROSS-REFERENCE TO RELATED APPLICATIONS

This application is based upon and claims the benefit of priority from prior Japanese Patent Application No. 2003-431437, filed Dec. 25, 2003, the entire contents of which are incorporated herein by reference.

BACKGROUND OF THE INVENTION

1. Field of the Invention

The present invention relates to an optical disk apparatus that records and reproduces information on and from an optical disk, as well as a method for controlling the optical disk apparatus, and in particular, to an optical disk apparatus that automatically determines a standard for the optical disk.

2. Description of the Related Art

As is well known, techniques for densely recording information have been promoted in recent years. Optical disks having a recording capacity of 4.7 GB (Giga Bytes) in one layer of one side have been put to practical use.

Optical disks of this kind include, for example, a reproduction-only DVD-ROM (Digital Versatile Disk-Read Only Memory), a rewritable DVD-RAM (Random Access Memory), a DVD-RW (Rewritable), a +RW, and a recordable DVD-R (Recordable), which conform to various standards.

An optical disk apparatus that can execute recording and reproduction on optical disks conforming to several types of standards comprises a function utilizing the fact that the light reflectance of the optical disk varies depending on the standard. This function automatically determines the standard for the optical disk installed to regulate each section of the optical disk apparatus and change settings on the basis of the result of the determination.

Even when conforming to the same standard, current rewritable optical disks are further classified into plural types on the basis of the characteristics of a recording film used in the disk.

Specifically, there are two types of rewritable optical disks. One of them has a high light reflectance and records data after inverting (initializing) a characteristic of a recording film so that the film, which otherwise photoelectrically converts reflected light into an H (High) level, photoelectrically converts the reflected light into a L (Low) level (this type of optical disk will hereinafter be referred to as an L-H medium). The other has a low light reflectance and records data after inverting (initializing) the characteristic of the recording film so that the film, which otherwise photoelectrically converts the reflected light into the L level, photoelectrically converts the reflected light into the H level (this type of optical disk will hereinafter be referred to as an H-L medium).

Thus, it is important to have a function for not only determining a basic standard such as the DVD-RAM, DVD-RW, and +RW but also automatically determining whether each of the rewritable optical disks conforming to the same standard is an L-H or H-L medium to regulate each section of the optical disk apparatus, and change settings.

Jpn. Pat. Appln. KOKAI Publication No. 2001-266367 discloses a configuration that executes a focus search on an optical disk installed to measure the light reflectance of the optical disk on the basis of a focus error signal obtained. The configuration thus determines whether the disk is a CD (Compact Disk)-ROM, a CD-R, or a CD-RW to switch recording and reproducing circuits in accordance with the result of the determination.

This publication does not describe the automatic determination of the type of rewritable optical disk conforming to the same standard, the type of which is based on the characteristic of the recording film used.

BRIEF SUMMARY OF THE INVENTION

According to the present invention there is provided an optical disk apparatus in which a first, second, third, and fourth optical disks are selectively installed, the first and second optical disks having different recording film characteristics and both having a single-layer recording layer, the third and fourth optical disks having different recording film characteristics and both having a double-layer recording layer, the optical disk apparatus recording and reproducing information on and from the optical disk installed. The optical disk apparatus comprises an optical head which irradiates the optical disk installed with a light beam to provide a reproduction signal corresponding to reflected light and a determining section which uses the optical head to reproduce information from an innermost peripheral portion of the optical disk installed to determine which of the first to fourth optical disks has been installed, on the basis of the level of a reproduction signal obtained.

The optical disk apparatus further comprises a reproduction signal processing section which processes the reproduction signal provided by the optical head to extract information from the reproduction signal, and a control section which controls the reproduction signal processing section on the basis of the result of the determination by the determining section. The control section controls the reproduction signal processing section on the basis of the result of the determination by the determining section to reproduce information indicating the type of the optical disk recorded in the inner peripheral portion of the optical disk installed. The control section then checks the information reproduced against the result of the determination by the determining section to determine which of the first to fourth optical disks has been installed.

By enabling the recording and reproduction of information when the mixture of four types of rewritable media conforming to the same standard but having different recording film characteristics is used, it is possible to allow the reproducible standard-conforming media to be flexibly used. This in turn allows a recording film suitable for a purpose or application (recording and reproducing speed, the number of times a rewriting and recording operations are performed, recording capacity, and the like) to be selected from a group of a larger number of recording films. Further, when the type of the medium is determined on the basis of evaluation of the intensity of a reproduction signal from a BCA area, which intensity corresponds to the reflectance of the recording film, book version information can be compared with the result of the determination or can be used as a reference. As a result, very reliable medium determinations can be made. Furthermore, since the BCA detection and the medium identification are simultaneously carried out, an activating process before the reproduction of information from a lead-in area can be executed at high speed. Moreover, a circuit that reproduces information from a data area can be pre-switched to allow information to be reproduced from the data area at high speed.

A recording medium according to the present invention serves as an optical disk applied to the above optical disk apparatus. The innermost peripheral portion of the recording medium has a BCA and includes a double-layer L-H medium and a double-layer H-L medium. The range of light reflectance of an L0 layer of the double-layer L-H medium in an initialized state does not overlap the range of light reflectance of an L0 layer of the double-layer H-L medium in an uninitialized state. Further, the recording medium includes a single-layer L-H medium and a single-layer H-L medium. The light reflectances of the single-layer L-H medium in the initialized state, the L0 layer of the double-layer H-L medium in the initialized state, and the L0 layer of the double-layer L-H medium in the uninitialized state do not overlap the light reflectance of the single-layer H-L medium in the initialized state.

Accordingly, to determine one of the media conforming to the same standard which has a different recording film characteristics, it is possible to set a common reference value for reproduction signal intensities corresponding to the recording film characteristics. Further, since the reference value can be set, an apparatus can be produced which accurately determines the four types of media conforming to the same standard but having different recording film characteristics. Moreover, by evaluating the intensity of a signal from the BCA area, it is possible to finish medium determinations before entering the lead-in area. Consequently, an apparatus can be produced which can activate a reproducing and recording circuit corresponding to the recording film characteristic.

The recording media according to the present invention are formed so that the light reflectances of the single-layer L-H medium in the initialized state, the L0 layer of the double-layer H-L medium in the initialized state, and the L0 layer of the double-layer L-H medium in the initialized state and uninitialized state are each set at 4 to 10%. The light reflectance of the single-layer H-L medium in the initialized state is set at 12 to 40%.

Therefore, by setting the reflectance in the initialized state at a value larger than the minimum one at which an electric circuit can execute reproduction, it is possible to ensure that address information or the like is obtained during reproduction. Further, by setting both reflectances within the range in which a good reproduction signal is obtained, it is possible to produce an apparatus that can make determinations while retaining the high manufacturing quality of the medium.

For the first to fourth optical disks conforming to the same standard but having different recording film characteristics, it is determined which of the first to fourth optical disks has been installed, on the basis of the level of a reproduction signal obtained by reproducing information from the innermost peripheral portion of the disk. This makes it possible to not only determine the basic standard for the optical disk but also automatically determine the type of the rewritable optical disks conforming to the same standard, the type of which is based on the characteristic of the recording film.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an embodiment of the present invention and illustrating the structure of an information recording area in a single-layer rewritable optical disk;

FIG. 6 is a flowchart illustrating an operation performed by the optical disk apparatus to make automatic determinations for the optical disk to execute a recording or reproducing process;

FIGS. 7A and 7B are diagrams illustrating the relationship between an example of the manner in which bar code information is written in the BCA of the optical disk and reproduction signals from the optical disk;

FIG. 8A through 8C are diagrams illustrating the relationship between another example of the manner in which bar code information is written in the BCA of the optical disk and reproduction signals from the optical disk;

DETAILED DESCRIPTION OF THE INVENTION

Figures 2, 3:
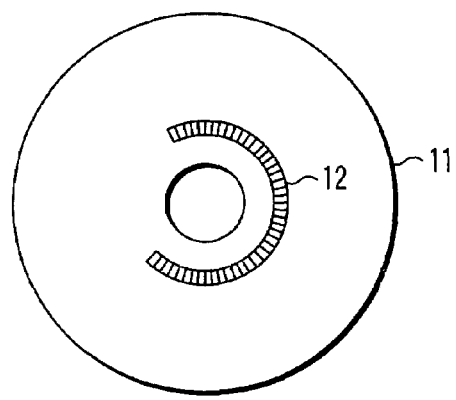
FIG. 2 is a diagram illustrating that information has been written in a BCA of the optical disk using a bar code.
FIG. 3 is a table illustrating, in detail, information written in the BCA of the optical disk using the bar code.

Embodiments of the present invention will be described below in detail. FIG. 1 shows the structure of an information recording area in a single-layer rewritable optical disk 11. The following areas are formed in the optical disk from its inner periphery to its outer periphery: a BCA (Burst Cutting Area) 12, a system lead-in area 13, a connection area 14, a data lead-in area 15, a data area 16, and a data lead-out area 17.

The data lead-in area 15, the data area 16, and the data lead-out area 17 employ a land groove system that uses concaves and convexes in the information recording layer to form an information recording track. Further, recorded information is read from the innermost peripheral BCA 12 to the outer periphery.

Information is written in the BCA 12 of the optical disk 11 using a bar code as shown in FIG. 2. The information written using the bar code includes the book version of standards and information on copyright protection as shown in FIG. 3.

Two techniques are available for using a bar code to write information in the BCA 12. One of the techniques initializes a recoding film of the entire optical disk 11 and then removes the recording film and a reflecting film by laser trimming. The other utilizes a difference in light reflectance between an initialized state and uninitialized state of the recording film.

Figure 4:
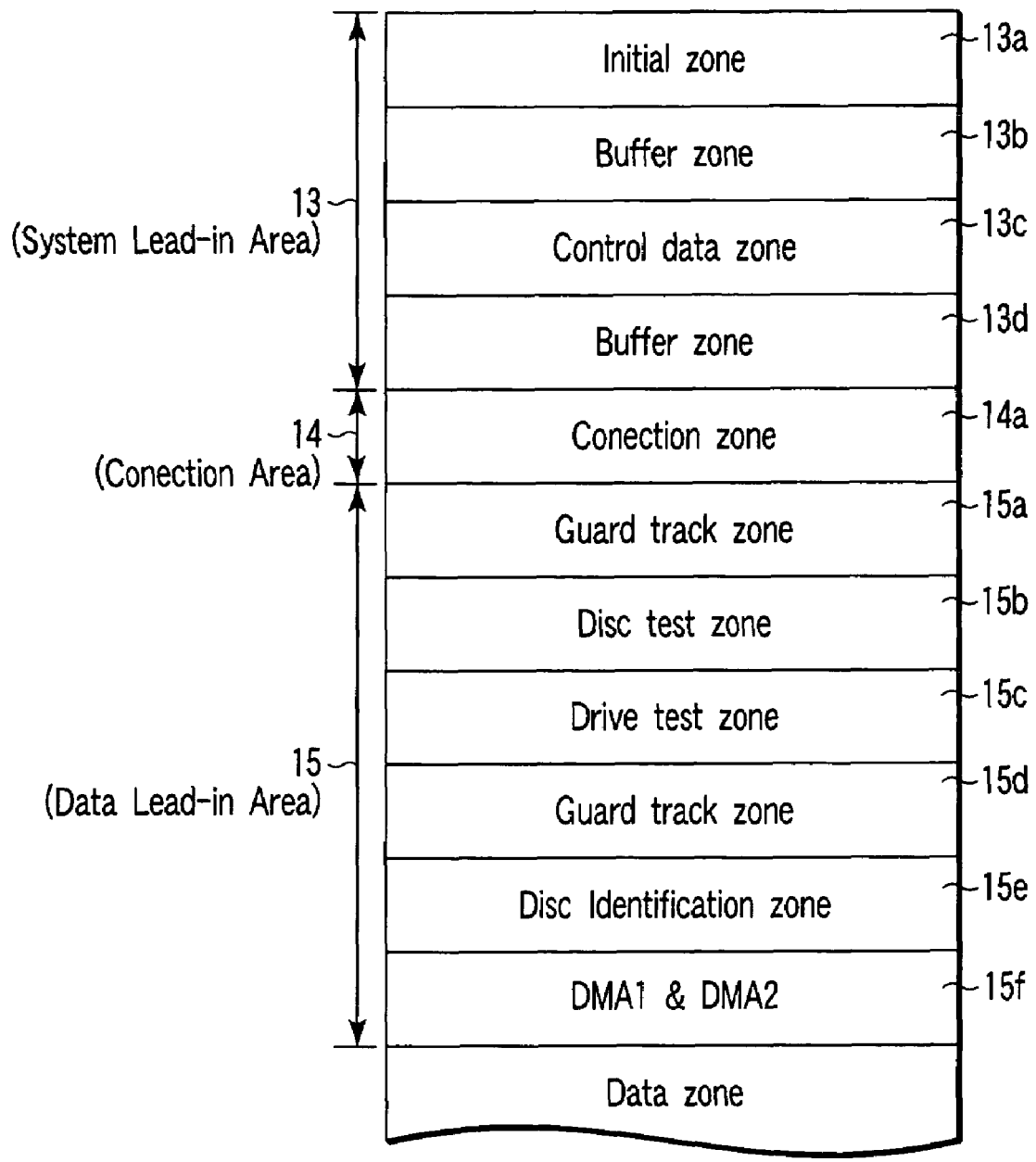
FIG. 4 is a diagram illustrating the data structure of a system lead-in area, a connection area, and a data lead-in area in the optical disk.

FIG. 4 shows the data structure of the system lead-in area 13, connection area 14, and data lead-in area 15. Four zones, including an initial zone 13a, a buffer zone 13b, a control data zone 13c, and a buffer zone 13d are constructed in the system lead-in area 13 in this order from inner periphery to outer periphery.

The connection area 14 is composed only of a connection zone 14a. Six zones including a guard track zone 15a, a disk test zone 15b, a drive test zone 15c, guard track zone 15d, a disk identification zone 15e, and DMA1 & DMA2 15f are formed in the data lead-in area 15 in this order from inner periphery to outer periphery.

Figure 5:
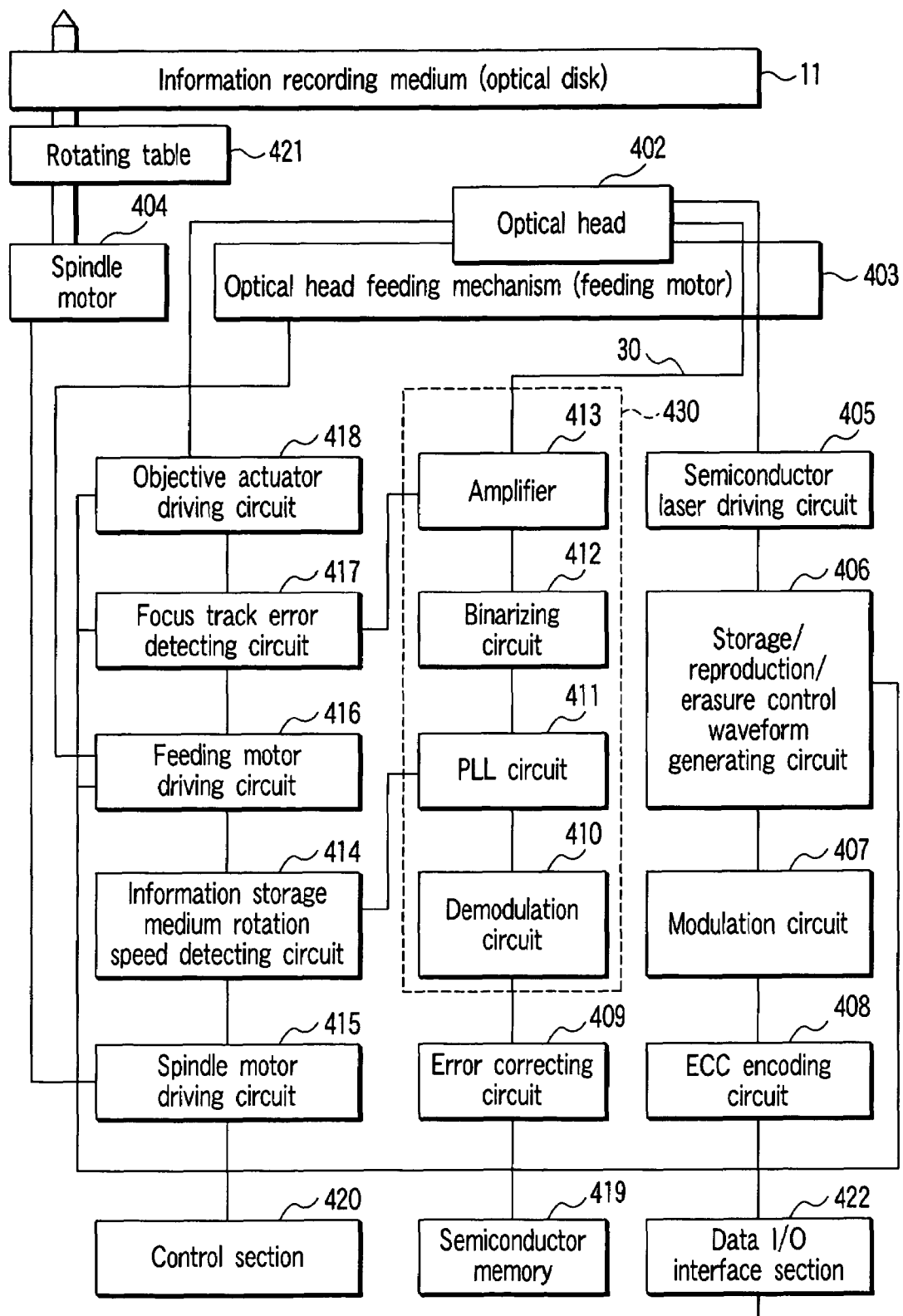
FIG. 5 is a block diagram illustrating an optical disk apparatus that records and reproduces information on and from the optical disk.

Now, description will be given of an information recording and reproducing apparatus to which an embodiment of the present invention is applied. FIG. 5 is a block diagram showing the configuration of the information recording and reproducing apparatus.

Reference numerals 401 and 402 denote an information recording medium (optical disk) and an optical head, respectively. Reference numeral 403 denotes a head feeding mechanism that controllably moves the optical head in a radial direction of the disk. A host apparatus (not shown) inputs record signal to an ECC encoding circuit 408 via a data I/O interface 422. The record signal is ECC-blocked and then supplied to a modulating circuit 407. The modulating circuit 407 then subjects the information to, for example, an 8/16 modulation. The information modulated is then input to a recording, reproduction, erasure, and control waveform generating circuit 406 to become a recording signal. The recording signal is supplied to a laser driving circuit 405 to control the intensity of a laser beam from the optical head 402.

During reproduction, the optical head 402 reads a reproduction signal and an amplifier 413 amplifies the signal. The signal amplified is then input to a binarizing circuit 412, which binarizes the signal. The binarized signal is input to a PLL circuit 411 and a demodulating circuit 410. The demodulating circuit 410 carries out 16/8 demodulation. An error correcting circuit 409 then corrects errors in the signal demodulated for each ECC block. At this time, a semiconductor memory 419 is utilized. The amplifier 413, the binarizing circuit, the PLL circuit 411, and the demodulating circuit constitute a reproducing circuit (reproduction signal processing circuit) 430. The reproducing circuit 430 executes, for example, PRML (Partial Response and Maximum Likelihood) signal processing to execute information from a reproduction signal 30. The reproducing circuit 430 changes the gain of the amplifier 413 or processing parameters for the PRML signal processing for each area on the disk, that is, the BCA 12, the system lead-in area 13, or the like, on the basis of an instruction from a control section 420. The reproducing circuit 430 thus appropriately extracts information from the reproduction signal 30.

A clock from the PLL circuit is input to a medium rotation speed detecting circuit 414. Rotation speed information detected by the medium rotation speed detecting circuit 414 is input to a spindle motor control section 415. The spindle motor control section 415 controls the rotation of a motor 404 to rotate a rotating table 421 so as to obtain the desired rotation speed of the optical disk 11.

A feeding motor driving circuit 416 controls a feeding motor of the head feeding mechanism 403 and thus the relative positions of the optical head 402 and disk 401. A focus tracking error detecting circuit 417 detects a focus error, a tracking error, or the like in an optical head signal. The focus tracking error detecting circuit 417 provides an objective actuator driving mechanism 418 with a control signal for the error. This corrects the focus or tracking of the optical head 402. The control section 420 controls all the blocks and makes determination for the optical disk installed in the present apparatus. During recording, the control section 420, for example, generates management information recorded in the disk. During reproduction, the control section 420 recognizes, for example, a position from which management information is read and reproduced.

For the rewritable optical disk 11, many types of recording films suitable for the respective purposes or applications haven been developed; the recording films are intended to, for example, improve the reliability of information recorded or reproduced, increase the number of times that information can be rewritten, or increase the recording speed. Whether the optical disk 11 is an L-H or H-L medium, previously described, depends on the characteristics of the recording film used.

For the conventional optical disk apparatus, the reproduction signal characteristic of the rewritable optical disk 11 is strictly defined. Accordingly, it is impossible to deal with the mixture of optical disks 11 with different types of recording films for the respective purposes or applications. In other words, the conventional optical disk apparatus cannot be adapted for the optical disk of an L-H medium as well as the optical disk 11 of an H-L medium in connection with recording or reproduction.

FIG. 6 is a flowchart showing an operation performed by the optical disk apparatus 18 to automatically determine whether the optical disk 11 installed is an L-H or H-L medium to realize a recording or reproducing process adapted for the optical disk 11, that is, to enable the mixed use of the L-H and H-L media.

First, the optical disk 11 is installed on the rotating table 421 to cause the apparatus to start operation (step S1). In step S2, the control section 420 rotatively drives the optical disk. In step S3, the control section 420 moves the optical head 402 to the innermost peripheral portion of the optical disk 11. In step S4, the control section 420 causes a laser diode in the optical head 402 to emit light.

In step S5, the control section 420 carries out what is called a focus search; the control section 420 finds a surface reflection position of the optical disk 11 and moves an objective lens in the optical head 402 in a focus direction to search for a focused position of the lens. During the focus search, in step S6, the control section 420 measures the light reflectance on the basis of the level of a reproduction signal. The control section 420 thus recognizes that the rewritable optical disk 11 has been installed.

Subsequently, in step S7, the control section 420 moves the optical head 402 in the radial direction of the optical disk 11 to detect the BCA 12. In step S8, the control section 420 thus determines whether the optical disk is an L-H or H-L medium. Although described later in detail, this determination is made on the basis of a difference in reproduction signal level resulting from a difference in the reflectance of the recording film in the BCA 12 as well as the results of reading of bar code information (book version) recorded in the BCA 12.

Then, in step S9, the control section 420 regulates each section of the apparatus and changes settings so as to adapt the apparatus for recording or reproduction executed on the optical disk 11 for which determination was made in step S8. In step S10, the control section 420 carries out envelope detection to detect the system lead-in area 13. In step S11, the control section 420 passes through the connection area 14. In step S12, the control section 420 detects the data lead-in area 15. In step S13, the control section 420 executes recording or reproduction on the data area 16. The control section 420 thus finishes the operation (step S14).

In the above operation, immediately after detecting the BCA 12, the control section 420 determines whether the optical disk 11 is an L-H or H-L medium. Accordingly, in particular, the present invention has the advantage of reducing the time required to activate a circuit section that executes reproduction on the lead-in area.

There are two techniques for determining whether the optical disk 11 is an L-H or H-L medium on the basis of the level of the reproduction signal from the BCA 12. This is because the determination depends on the form in which bar code information is written in the BCA 12.

FIG. 7A shows a disk in which after a formation of a recording film 40 and an initializing process has been executed to all over the surface of a disk substrate 39, bar code information is written by partly removing the recording film 40.

In this case, the recoding film 40 in an H-L medium has a higher light reflectance than that in an L-H medium. In other words, the recoding film 40 in the H-L medium has a higher reproduction signal level than that in the L-H medium. FIG. 7B shows the reproduction signal levels of bar code information written in the BCAs 12 of optical disks of an L-H and H-L media.

Parts of the optical disk free from the recording film have a light reflectance of almost 0%. Accordingly, the intensity of reflected light from these parts, that is, the minimum level of reproduction signals is almost zero. The maximum level Smax of a reproduction signal from a certain part of the recording film 40 corresponds to a light reflectance characteristic of the recording film 40. It is thus possible to accurately evaluate a difference in light reflectance between the L-H medium and the H-L medium.

Specifically, a determination reference level is set between the lower limit (the level of the lowest peak) of the maximum level Smax (H-L) of a reproduction signal from the H-L medium and the upper limit (the level of the highest peak) of the maximum level Smax (L-H) of a reproduction signal from the L-H medium. The maximum level Smax of the reproduction signal is compared with the determination reference level to determine the optical disk to be an L-H or H-L medium.

Then, after determination has been made on the basis of the reproduction signal level, the result of the determination is checked against the information on the book version of the standards read from the BCA 12. This further improves the reliability of the result of the determination.

Now, description will be given of a disk in which bar code information is written on the basis of whether or not the recording film has been initialized. In such a disk, as shown in FIG. 8A, an uninitialized recording film 42 is formed over the entire surface of a disk substrate 41. Bar code information is written in the recording film 42 by partly initializing the recording film 42. In FIG. 8A, shaded parts denote the initialized parts. In this case, almost the entire recording film 42 in the BCA is uninitialized. Thus, the probability of reproduction signal from the BCA which is at a level obtained in the uninitialized state is much larger than that of reproduction signal from the BCA which is at a level obtained in the initialized state.

Specifically, as shown in FIG. 8B, in the L-H medium, the uninitialized part has a higher reflectance, and a reproduction signal from the uninitialized part is at the H level. The initialized part has a lower reflectance, and a reproduction signal from the initialized part is at the L level. Thus, the rate at which a reproduction signal at the H level is obtained is much higher than that at which a reproduction signal at the L level is obtained. This makes it possible to determine that the optical disk is an L-H medium.

In contrast, as shown in FIG. 8B, in the H-L medium, the uninitialized part has a lower reflectance, and a reproduction signal from the uninitialized part is at the L level. The initialized part has a higher reflectance, and a reproduction signal from the initialized part is at the H level. Thus, the rate at which a reproduction signal at the L level is obtained is much higher than that at which a reproduction signal at the H level is obtained. This makes it possible to determine that the optical disk is an H-L medium.

Even with a disk in which bar code information is written by partly leaving the recording film 42 uninitialized when the while recording film 42 is initialized, the optical disk can be determined to be an L-H or H-L medium on the basis of the reproduction signal level as described above.

However, in this case, the optical disk is determined to be an H-L disk when the rate at which a reproduction signal at the H level is obtained is higher than the rate at which a reproduction signal at the L level is obtained. On the other hand, the optical disk is determined to be an L-H disk when the rate at which a reproduction signal at the L level is obtained is higher than the rate at which a reproduction signal at the H level is obtained. In this manner, the result of the determination is opposite to that described above.

If the determination is made on the basis of the reproduction signal level as described above, the reliability of the determination result can also further be improved by checking the result of the determination against the information on the book version of the standards read from the BCA 12.

Figure 9:
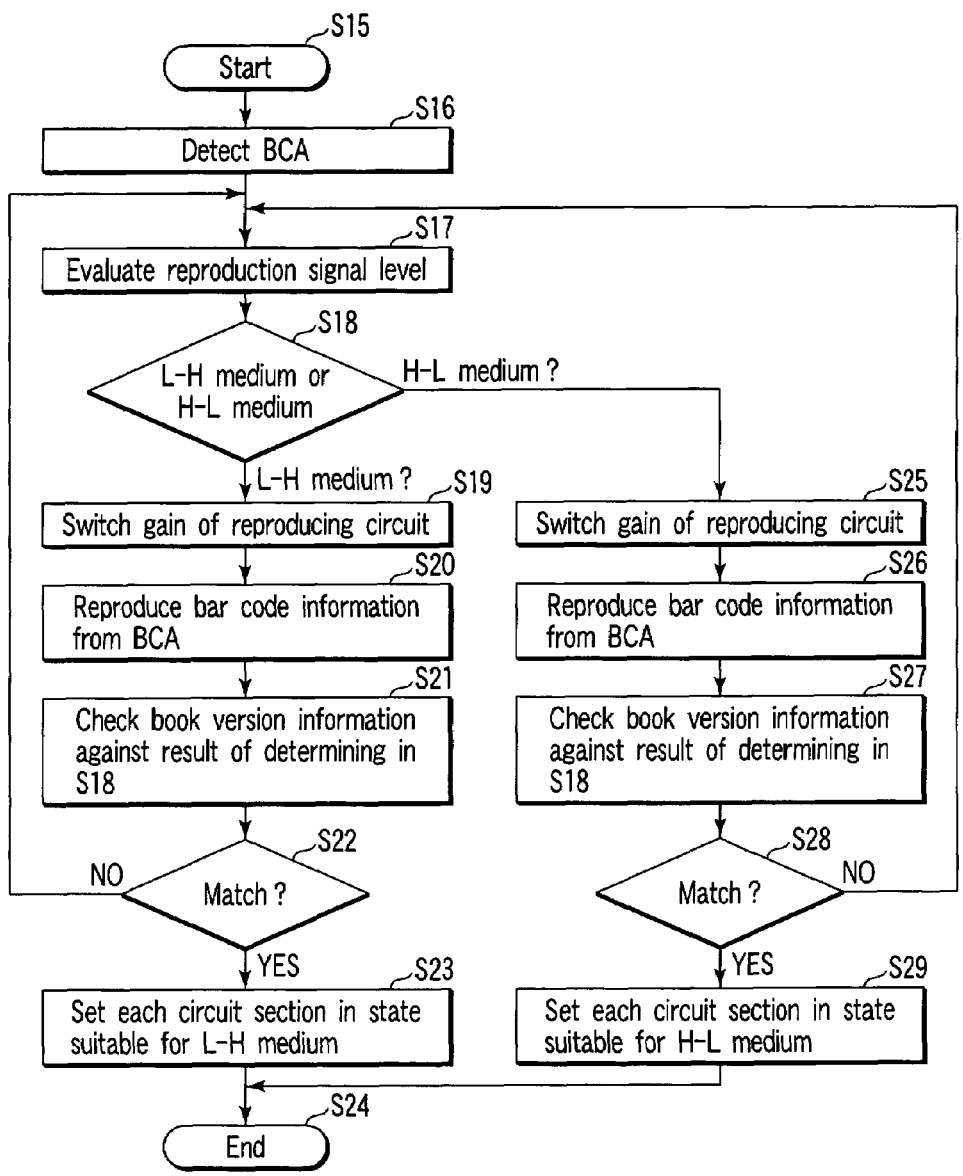
FIG. 9 is a flowchart illustrating, in detail, an essential part of an operation performed by the optical disk apparatus to make automatic determinations for the optical disk to execute a recording or reproducing process.

FIG. 9 is a flowchart illustrating, in detail, an operation for making determination for the optical disk 11 as described above, particularly an operation performed in steps S7 to S9, shown in FIG. 6.

First, an operation is started (step S15). In step S16, the BCA 12 is detected. Then, in step S17, the control section 420 evaluates the reproduction signal level. In step S18, the control section 420 determines whether the optical disk is an L-H or H-L medium.

If the optical disk is determined to be an L-H medium, then in step S19, the control section 420 switches the gain of the amplifier 413 in the reproducing circuit 430, which processes a reproduction signal from the BCA 12, to a value compatible with the L-H medium.

Subsequently, in step S20, the control section 420 reads and reproduces the book version information, that is, the bar code information, from the BCA 12. In step S21, the control section 420 checks the book version information against the result of the determination in step S18. In step S22, the control section 420 determines whether or not they match.

Here, if the book version information and the determination result are determined not to match (NO), the flow returns to the processing in step S17. If they are determined to match (YES), then in step S23, the control section 420 sets the signal processing section for recording and reproduction so that it is compatible with the L-H medium. The control section 420 then finishes the operation (step S24).

On the other hand, if the optical disk is determined to be an H-L medium in step S18, the control section 420 switches the gain of the amplifier 413, which amplifies a reproduction signal from the BCA 12, to a value compatible with the H-L medium.

Subsequently, in step S26, the control section 420 reads and reproduces the book version information, that is, the bar code information, from the BCA 12. In step S27, the control section 420 checks the book version information against the result of the determination in step S18. In step S28, the control section 420 determines whether or not they match.

Here, if the book version information and the determination result are determined not to match (NO), the flow returns to the processing in step S17. If they are determined to match (YES), then in step S29, the control section 420 sets the signal processing section for recording and reproduction so that it is compatible with the H-L medium. The control section 420 then finishes the operation (step S24).

As described above, in order that the level of a reproduction signal from the BCA 12 is used to determine whether the optical disk is an L-H or H-L medium, the light reflectance of the L-H medium in its initialized state is set 4 to 10%. On the other hand, the light reflectance of the H-L medium in its initialized state is set at 12 to 40%.

This is because it is necessary that the ranges of the light reflectances of both mediums in their initialized state (the L level of the L-H medium and the H level of the H-L medium) do not overlap each other, that is, the light reflectance at the H level, the initialized state of the H-L medium, is higher than the upper limit of the light reflectance at the L level, the initialized state of the L-H medium.

A phase changing film used in the rewritable optical disk 11 similarly to conventional determining means based on the measurement of the light reflectance generally has a reflectance lower than 40%. Accordingly, the light reflectance at the L level is desirably as low as possible (as close to 0% as possible) so that the reproduction signal has a good contrast.

For the L-H medium, in the initialized state, reproduction signals obtained from all the areas are at the L level. Accordingly, since address information is reproduced, it is necessary to set the light reflectance at the L level to at least a reproducible level.

Thus, in view of electric noise of the reproducing circuit, it is generally desirable that the light reflectance be at least 5%. Circuit parts must be improved in order to detect a reproduction signal of a lower light reflectance than 5%. At present, it is thus difficult to realize an apparatus which can detect the lower light reflectance.

Figure 10:
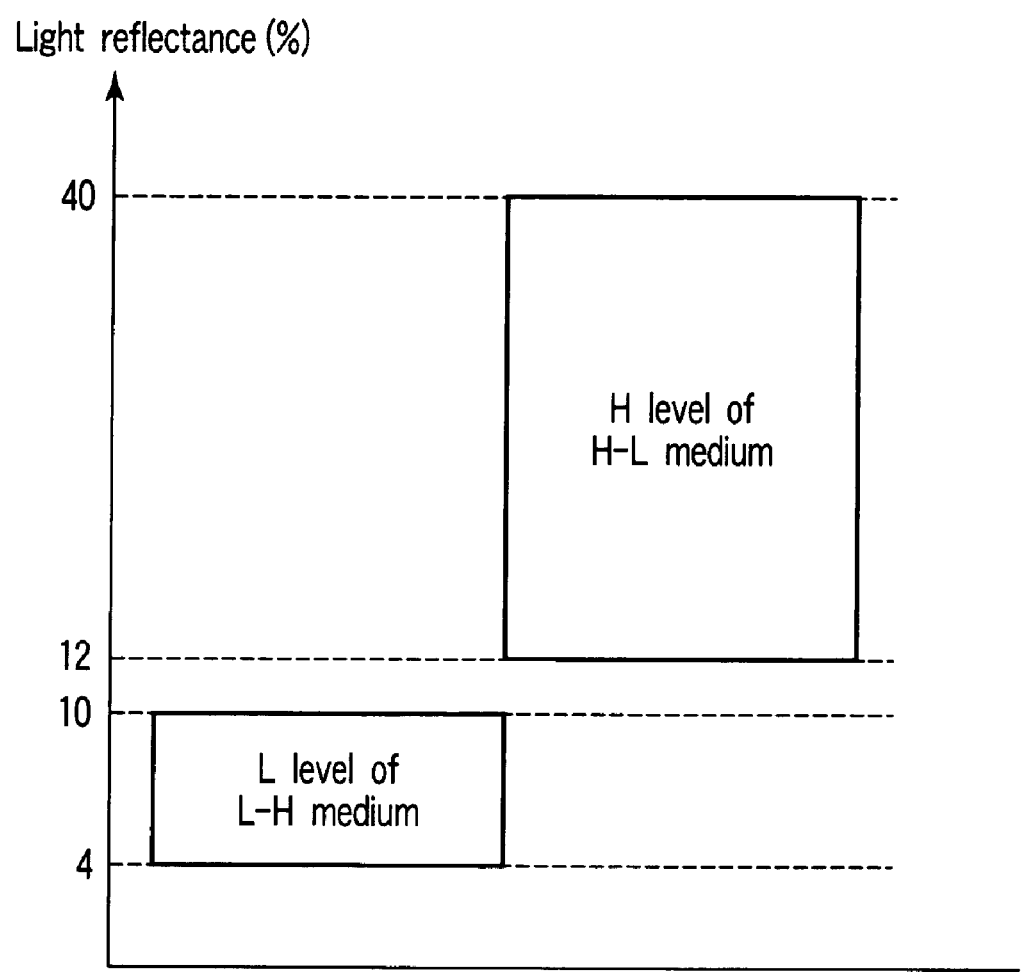
FIG. 10 is a diagram illustrating how to set light reflectances in an initialized state in accordance with the type of the optical disk.

However, as the light reflectance at the L level is increased so as to allow signals to be easily detected, the reproduction signal level increases, but the amount of noise also increases. Consequently, the total SN ratio decreases. Thus, the light reflectance of the L-H medium in the initialized state is desirably set to at most about 8%. As is apparent from the above description, the light reflectance of the L-H medium in the initialized state must be set at 4 to 10% as shown in FIG. 10, in order to manufacture a medium that provides good signal characteristics.

For the H-L medium, it has also been found out that the light reflectance in the initialized state (H level) must be set at about 15% in order to obtain good signal characteristics. However, the medium can be manufactured with a lower light reflectance.

However, the light reflectance of the H-L medium at the H level must be higher than 10%, which corresponds to the upper limit light reflectance of the L-H medium at the L level. Accordingly, the light reflectance is defined to be at least 12% as shown in FIG. 10.

Further, the upper limit light reflectance of the H-L medium at the H level may be about 40% of the upper limit of the light reflectance of common phase changing materials. Accordingly, the upper limit light reflectance is defined as 40% as shown in FIG. 10. As described above, by specifying the light reflectance of the single-layer rewritable optical disk 11 in the initialized state, it is possible to accurately determine whether the optical disk is an H-L or L-H medium, while retaining a good reproduction signal quality.

Description has been given of the disk determining method executed if only the single-layer rewritable optical disk is used. Now, description will be given of a disk determining method executed if a double-layer rewritable optical disk is also used.

In the double-layer rewritable optical disk, a layer (L0 layer) closer to a read-side surface and a layer (L1 layer) further from the read-side surface are present as recording surfaces. Information is reproduced and recorded by focusing laser light on one of the recording surfaces. As in the case of the single-layer medium, the recording film characteristics are H-L and L-H. The apparent reflectance of the L1 layer (the ratio of the intensity of reflected light to the intensity of incident light observed at the optical head) is about one-fourth the actual reflectance (the ratio of the intensity of light reflected directly from the recording film to the intensity of light incident directly on the recording film) taking the reflection and absorption by the L0 layer into account. The phase changing film generally has a reflectance of at most about 40%. Accordingly, the L1 layer has an apparent reflectance of at most about 10%. Further, it is known in connection with problems with a detection circuit that the reflectance of the recording film must be at least about 5% in order to carry out detection of address information, tracking, and focusing on the recording film. Accordingly, the apparent reflectance of the L1 layer in the initialized state must be at least about 5%.

For the L-H medium, the apparent reflectance of the L1 layer is at least about 5% in the initialized state (L level) and at most about 10% in the recording state (H level). For the H-L medium, the apparent reflectance in the initialized state (H level) is at most about 10%. However, the reflectance in the recording state (L level) can be set as close to 0% as possible in order to improve the SN ratio. For both recording film characteristics, the L0 layer must have a sufficient light transmittance to allow information to be read from the L1 layer. Accordingly, the reflectance of the L0 layer in the initialized state is preferably as low as possible. However, as in the case of the L1 layer, the reflectance of the L0 layer in the initialized state must be at least about 5% in order to carry out, for example, detection of the address section. As a result, for the L-H medium, an excessively high reflectance in the recording state (H level) increases inter-layer crosstalk. This affects reads from the L1 layer. On the other hand, for the H-L medium, the reflectance in the recording state (L level) can be set close to 0% in order to increase the SN ratio.

On the other hand, a double-layer medium can be produced by using different recording films, for example, the L-H characteristic in a first layer and the H-L characteristic in a second layer. However, the reproducing circuit must be switched before accessing information recorded in the other layer, so that highspeed accesses from the L0 layer to the L1 layer are impossible. Consequently, this configuration is not practical. Accordingly, the embodiment of the present invention relates to a medium having two layers with the same recording film characteristic.

The four types of media, a double-layer L-H and H-L media and a single-layer L-H and H-L media, are mixed together using the determining method based on the evaluation of the intensity of a reproduction signal from the BCA area as in the case of only the single-layer medium. This determining method can be roughly divided into two types in terms of a technique for writing bar code information in the BCA area. One of these methods writes a bar code in the BCA area by removing the recording film in the BCA area by laser trimming or the like. The other method records a bar code utilizing a difference in the reflectance of the recording film between the initialized state and the uninitialized state. A detailed description will be given below of the characteristic of a reproduction signal from the BCA area in each case and a medium determining method using these characteristics. In this case, the reflectance in the BCA area of the double-layer medium is evaluated by evaluating the intensity of a signal from the L0 layer as in the case of a reproduction-exclusive medium such as a DVD-ROM. This is because a signal from the L1 layer has passed through the L0 layer, an intermediate layer, and the like and is thus likely to be affected by environment, so that a signal from the L0 layer is more stable.

Figure 11A:
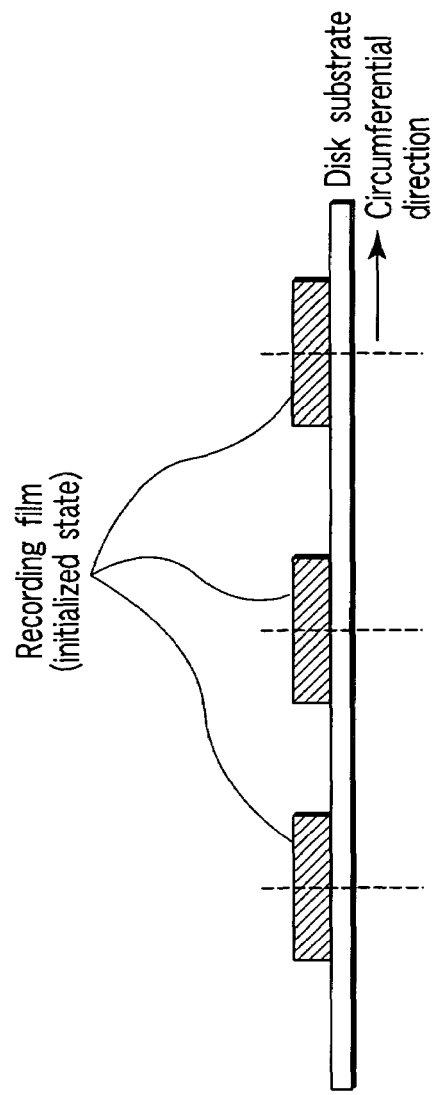
FIGS. 11A and 11B are diagrams showing the characteristics of reproduction signals obtained from the BCA area if a bar code is recorded by removing films from a single- and double-layer rewritable media.
Figure 11B:
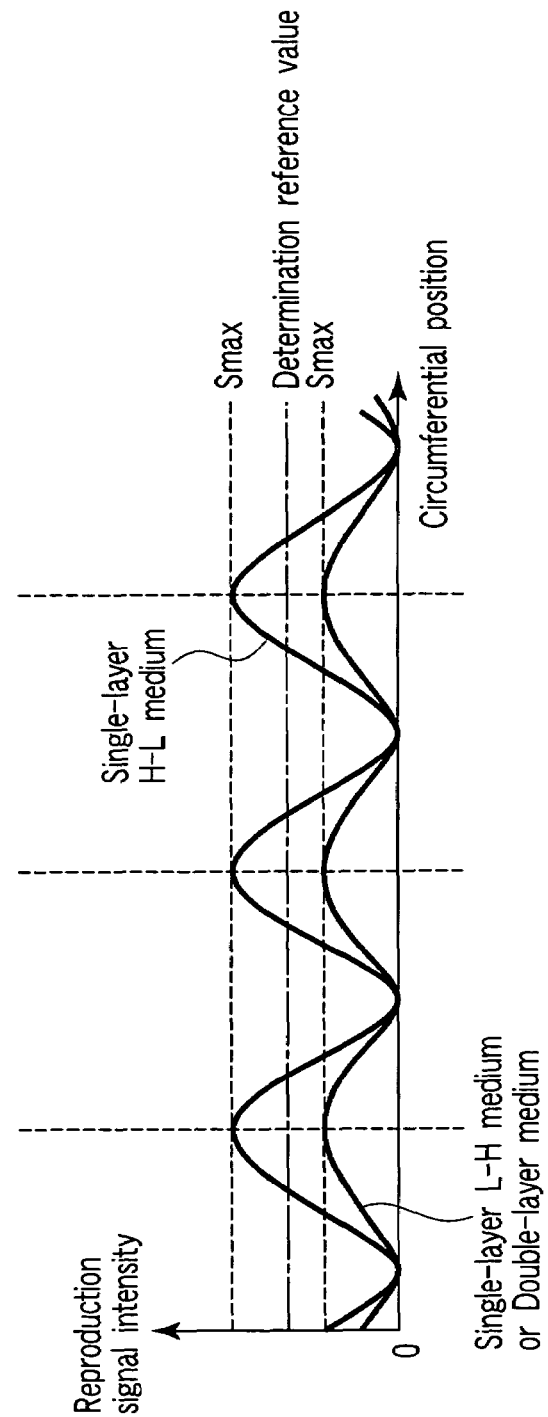

If a bar code is written by removing the recording film in the BCA area after the recording film in the whole medium has been initialized, the intensity of a reproduction signal corresponding to the reflectance of the recording film in the initialized state is first determined. As shown in FIG. 11, a reference value for the reproduction signal intensity is preset on the basis of the difference between the lower limit reflectance of the single-layer H-L medium in the initialized state (H level) and the upper limit reflectance of the single-layer L-H medium in the initialized state (L level). For the single-layer H-L medium, the maximum value for the reflection signal intensity is larger than the reference value. For the single-layer L-H medium, the maximum value for the reflection signal intensity is smaller than the reference value. Consequently, medium determination is possible.

Figure 12:
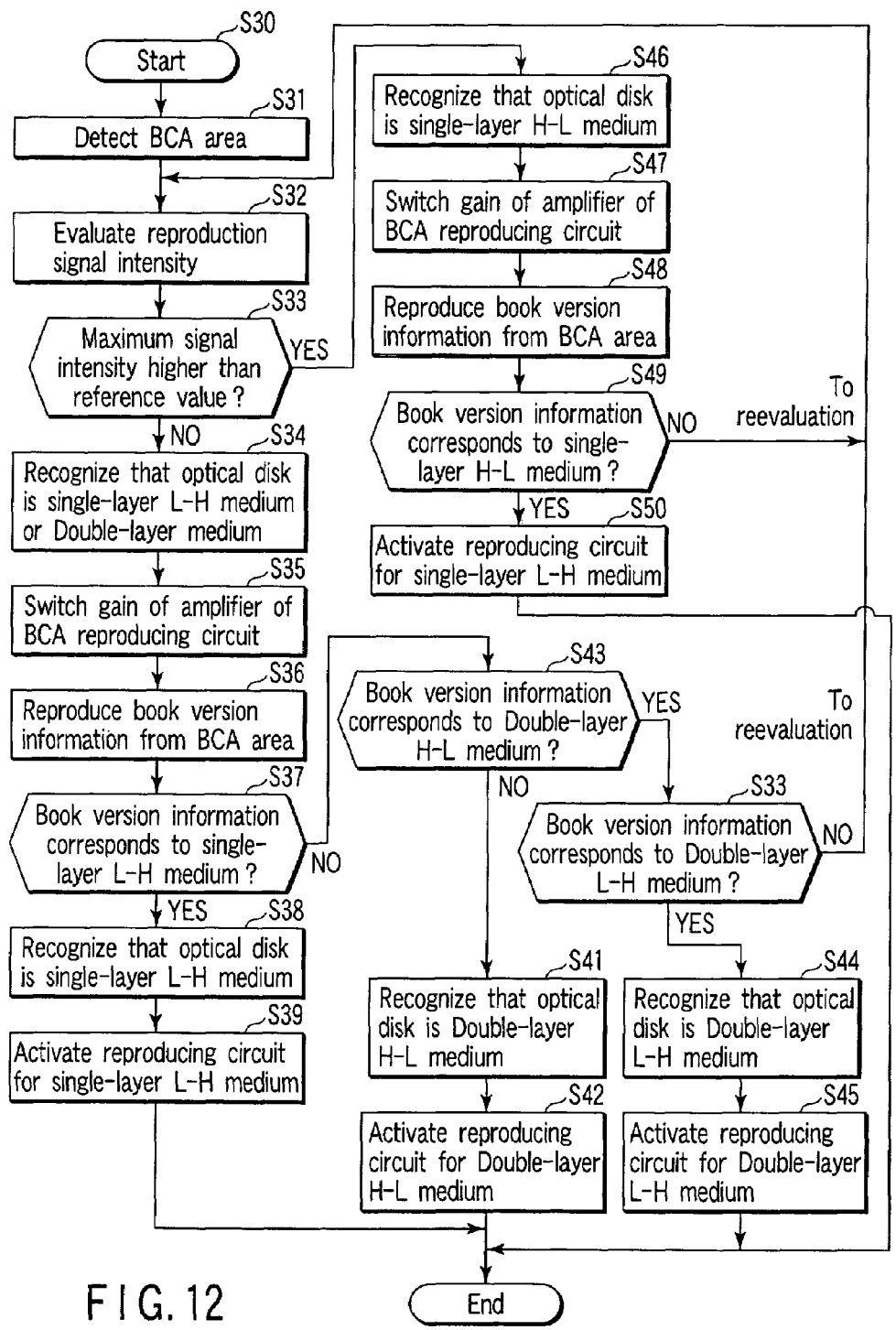
FIG. 12 is a flowchart of determination for the single- and double-layer rewritable media and switching of the reproducing and recording circuit in which bar code information is written in the BCA area by removing the recording film.

As previously described, for the double-layer L-H and double-layer H-L media, the reflectance of the L0 layer in the initialized state is about 5 to 7% as in the case of the single-layer L-H medium. Accordingly, for both media, the maximum value for the reflection signal intensity is smaller than the reference value. This makes it possible to distinguish these media from the single-layer H-L medium. FIG. 12 is a flowchart of medium determinations using a difference in reproduction signal intensity resulting from a difference in the reflectance of the recording film. A determining operation is started (step S30). The control section 420 first detects the BCA area (step S31). The control section 420 thus detects the maximum value for the reproduction signal intensity (step S32). If the maximum value is smaller than the reference value (NO in step S33), the control section 420 determines that the optical disk is a single-layer L-H medium or a double-layer L-H or H-L medium (step S34). On the basis of the result of the determination, the control section 420 adjusts, for example, the gain of the amplifier of the BCA reproducing circuit 430 (step S35). The control section 420 then accurately reproduces the book version information in the bar code information recorded in the BCA area (step S36). The control section 420 checks whether or not the book version information read corresponds to a single-layer L-H medium (step S37). If the book version information read corresponds to a single-layer L-H medium, the control section 420 determines that the optical disk is a single-layer L-H medium (step S38). The control section 420 then activates a reproducing circuit for a single-layer L-H medium, that is, sets, for example, the processing parameters of the reproducing circuit 430 for a single-layer L-H medium (step S39).

If the book version information does not correspond to a single-layer L-H medium (NO in step S37), the control section 420 checks whether or not the book version information corresponds to a double-layer H-L medium (step S40). If the book version information corresponds to a double-layer H-L medium (YES in step S40), the control section 420 determines that the optical disk is a double-layer H-L medium (step S41). The control section 420 then activates a reproducing circuit for a double-layer H-L medium, that is, sets, for example, the processing parameters of the reproducing circuit 430 for a double-layer H-L medium (step S42). If the optical disk is determined not to be a double-layer H-L medium (NO in step S40), the control section 420 checks whether or not the book version information corresponds to a double-layer L-H medium (step S43). If the book version information corresponds to a double-layer L-H medium (YES in step S43), the control section 420 determines that the optical disk is a double-layer L-H medium (step S44). The control section 420 then activates a reproducing circuit for a double-layer L-H medium, that is, sets, for example, the processing parameters of the reproducing circuit 430 for a double-layer L-H medium (step S45). If the book version information does not correspond to a double-layer L-H medium (NO in step S43), the flow returns to the evaluation of the reproduction signal intensity (step S32).

On the other hand, in the first evaluation of the signal intensity (step S32), if the maximum value of the reproduction signal intensity is larger than the reference value (YES in step S33), the control section 420 determines that the optical disk is a single-layer H-L medium (step S46). Then, the control section 420 adjusts the gain of the amplifier of the BCA reproducing circuit 430 (step S47). The control section 420 then reads and reproduces the book version information in the bar code information recorded in the BCA area (step S48). Then, the control section 420 checks whether or not the book version information read corresponds to a single-layer H-L medium (step S49). If the book version information matches the result of evaluation of the reproduction signal intensity, the control section 420 determines that the optical disk is a single-layer H-L medium (step S50). The control section 420 then activates a reproducing circuit for a single-layer H-L medium, that is, sets, for example, the processing parameters of the reproducing circuit 430 for a single-layer H-L medium (step S50). If the book version information does not match the result of evaluation of the reproduction signal intensity (NO in step S49, the flow returns to the evaluation of the reproduction signal intensity (step S32). During the above determining process, if a loop returning to the reevaluation of the reproduction signal intensity is entered many times, the control section 420 may output a medium determination error to allow the disk to be removed. Further, actually, not all these recording films need to be used, so that any steps of the determining method may be omitted.

Now, description will be given of recording of a bar code based on a difference in the reflectance of the recording film between the initialized state and the uninitialized state. As described for the determining method for only the single layer, medium determinations can be made by providing a reference value (reference value 1) for a signal intensity level corresponding to a reflectance that is not included in both reflectance ranges of the single-layer H-L and L-H media. Further, it is possible to determine whether the optical disk is a double-layer L-H or H-L medium by providing a reference value (reference value 2) to compare the intensity of a signal from the double-layer L-H medium in the initialized state (L level) with that from the double-layer H-L medium in the uninitialized state (L level).

Here, the reproduction signal characteristic depends on a method for producing a bar code in the BCA area, that is, whether the bars of the bar code are initialized or uninitialized. Possible problems can be prevented by predetermining whether the bars of the bar code are initialized or uninitialized. However, in the uninitialized state, the double-layer H-L medium has a reflectance lower than a detection sensitivity. Accordingly, when the bar code portion is initialized while the other portions are uninitialized, almost the entire BCA has such a low reflectance that detection is impossible. Thus, for the double-layer H-L medium, it is necessary to produce the bar code except for the bars in the initialized state, which provides a high reflectance, and the bar portions in the uninitialized state, which provides a low reflectance. Consequently, for the double-layer H-L medium, the bars in the bar code information recorded in the BCA area must be written in the uninitialized state. Therefore, the reproduction signal characteristic is uniquely determined. On the other hand, for the double-layer L-H medium, the reflectance of the L0 layer is about 5% in the initialized state and about 7% in the uninitialized state. Accordingly, for the double-layer L-H medium, the bars in the bar code information may be written in the initialized or uninitialized state.

Figure 13:
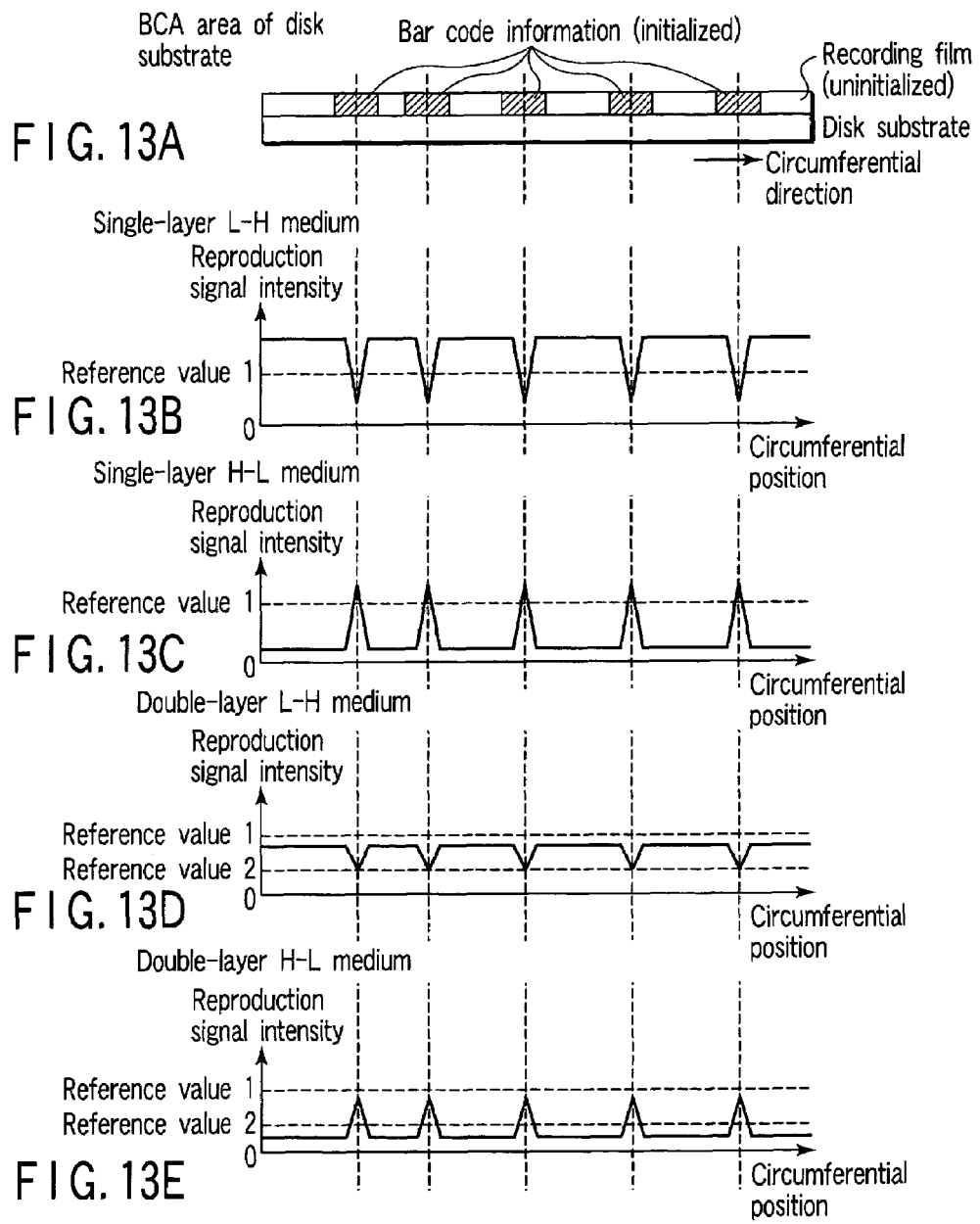
FIG. 13A through 13E are diagrams showing the characteristics of reproduction signals from the BCA area in which a bar code is written after the recording film of the rewritable medium has been initialized.

FIG. 13 shows signal characteristics observed when a bar code is produced, in the uninitialized state, in the BCA areas of a single- and double-layer rewritable media. FIG. 13A is a schematic diagram of the conditions of a recording film in this case. Here, shaded parts in the recording film indicate bar portions. FIGS. 13B and 13C show a comparison of the reflection signal intensity with reference values 1 and 2. The reference value 1 is the same as in the previously described embodiment. FIG. 13B shows the case of a single-layer L-H medium. The bars in the bar code information provide L signals. A comparison of the reproduction signal intensity with the reference value 1 indicates that the intensity of a signal from the bar is smaller than the reference value and that the intensity of a signal from the bar code except for the bars is larger than the reference value 1. FIG. 13C shows the case of a single-layer H-L medium. The bars in the bar code information provide H signals. In this case, the intensity of a signal from the bar is larger than the reference value. The intensity of a signal from the bar code except for the bars is smaller than the reference value 1.

FIG. 13D shows the case of the L0 layer of a double-layer L-H medium. The bar portions in the bar code signal provide L signals. In contrast to the single layer, both a signal from the bar and a signal from the bar code except for the bars have an intensity smaller than the reference value 1. FIG. 13E shows the case of the L0 layer of a double-layer H-L medium. The bar portions in the bar code signal provide L signals. As in the case of the double-layer L-H medium, both a signal from the bar and a signal from the bar code except for the bars have an intensity smaller than the reference value 1. A difference in signal characteristic between the double-layer L-H medium and the double-layer H-L medium is a difference in the intensity of the L signal. A comparison using the reference value 2 for a detection limit value indicates that the L signal from the double-layer L-H medium (the signal in the initialized state) requires a reflectance of at least about 5% in order to carry out reading of the address section, focusing, and tracking as previously described. Therefore, the L signal from the double-layer L-H medium must have an intensity larger than the reference value 2. On the other hand, to maximize the SN ratio, the double-layer H-L medium has a reflectance of about 0 to 2% in the uninitialized state and thus has an intensity smaller than the reference value 2. Therefore, a comparison with the reference value 2 makes it possible to determine whether the optical disk is a double-layer L-H or H-L medium.

Figure 14:
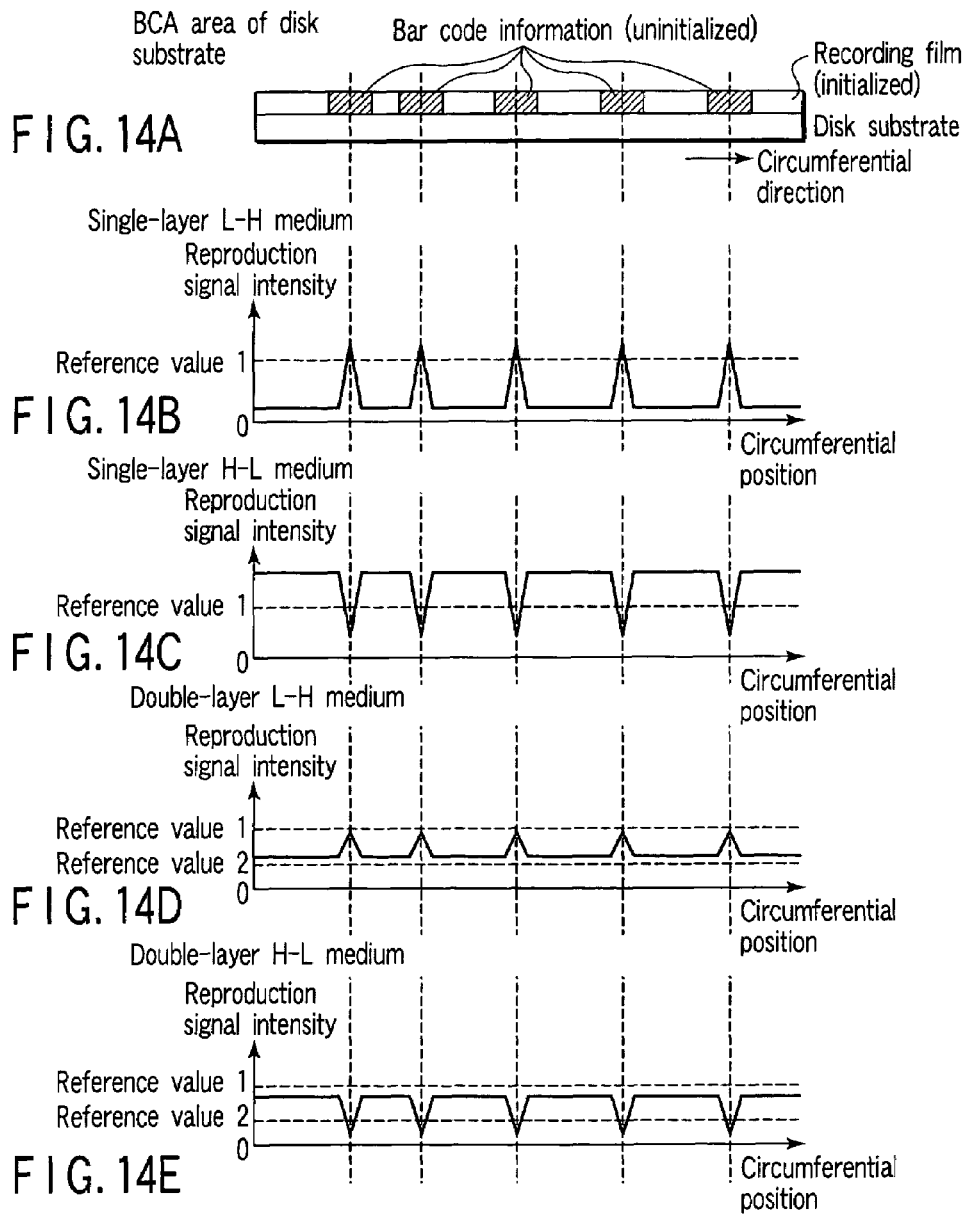
FIG. 14A through 14E are diagrams showing the characteristics of reproduction signals from the BCA area in which the bar code is written while the recording film of the rewritable medium is uninitialized.

FIG. 14 shows signal characteristics observed if bars of a bar code are produced, in the uninitialized state, in the BCA areas of a single- and double-layer rewritable media. FIG. 14A is a schematic diagram of the conditions of a recording film in this case. Here, shaded parts in the recording film indicate bar portions. FIGS. 14B to 14E show a comparison of the reflection signal intensity with reference values 1 and 2. FIG. 14B shows the case of a single-layer L-H medium. The bar portions in the bar code information provide H signals. A comparison the reproduction signal intensity with the reference value 1 indicates that the intensity of a signal from the bar portion is larger than the reference value and that the intensity of a signal from the bar code except for the bars is smaller than the reference value 1. FIG. 14C shows the case of a single-layer H-L medium. The bar portions in the bar code information provide L signals. In this case, the intensity of a signal from the bar is smaller than the reference value. The intensity of a signal from the bar code except for the bars is larger than the reference value 1.

FIG. 14D shows the case of the L0 layer of a double-layer L-H medium. The bar portions in the bar code signal provide H signals. In contrast to the single layer, both a signal from the bar and a signal from the bar code except for the bars have an intensity smaller than the reference value 1. Further, the intensity of the signal from the bar code except for the bars is larger than the reference value 2 on the basis of the signal detection conditions previously described. FIG. 13E shows the case of the L0 layer of a double-layer H-L medium. The bar portions are reproduced using L signals. Both a signal from the bar and a signal from the bar code except for the bars have an intensity smaller than the reference value 1. Further, the intensity of the signal from the bar portion is smaller than the reference value 2.

Figure 15:
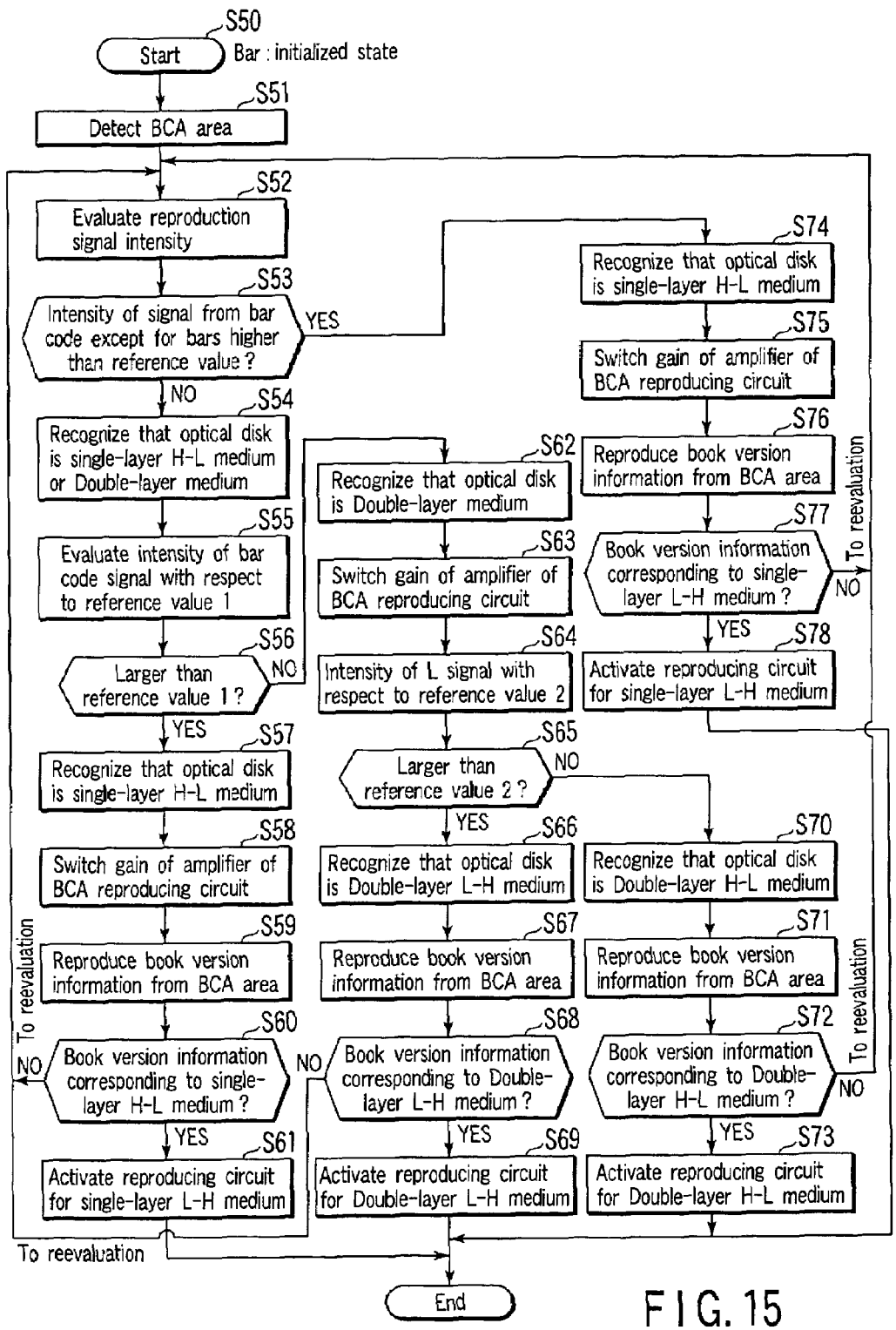
FIG. 15 is a flowchart of determinations for the single- and double-layer rewritable media and switching of the reproducing and recording circuit in which bar code information is written in the BCA area in the initialized state.

A detailed description will be given below of a determination method executed in accordance with the method of producing a bar code in the BCA area of a single-layer medium. This method is applied to an optical disk apparatus such as the one shown in FIG. 5. This method is executed by a control section such as the one denoted by reference numeral 220. FIG. 15 is a flow chart of determinations made if bars of a bar code are written, in the initialized state, in the BCA areas of a single- and double-layer rewritable media. A determining operation is started (step S50). As in the case of only the single-layer medium, the control section 420 first detects the BCA area (step S51). The control section 420 then evaluates the reproduction signal intensity using the method shown in FIG. 7 or 8, previously described (step S52). If a signal from the bar code except for the bars in the BCA area has an intensity smaller than the reference value (NO in step S53), the control section 420 recognizes that the optical disk is a single H-L medium or a double-layer medium (step S54). Then, the control section 420 evaluates the reproduction intensity of the bar portion of the bar code (step S55). If the reproduction intensity of the bar portion is larger than the reference value 1, the control section 420 determines that the optical disk is a single-layer H-L medium (step S57). On the basis of the result of the determination, the control section 420 adjusts the gain of the amplifier of the BCA reproducing circuit 430 (step S58). The control section 420 then reproduces the book version contained in the bar code information (step S59). Then, the control section 420 checks whether or not the book version matches a single-layer H-L medium determined on the basis of the evaluation of the signal intensity (step S60). If the book version matches the single-layer H-L medium, the control section 420 activates a reproducing circuit for a single-layer H-L medium as previously described (step S61). If the book version does not match the single-layer H-L medium, the flow returns to the evaluation of the reproduction signal intensity. Further, when the reproduction intensity of the bar portion of the bar code is evaluated (step D56), if it is smaller than the reference value 1, then the control section 420 recognizes that the optical disk is a double-layer medium (step S62). Subsequently, the control section 420 similarly adjusts the gain of the amplifier of the BCA reproducing circuit 430 (step S63). The control section 420 then compares the L signal intensity with the reference value 2 (step S64). If the L signal has an intensity larger than the reference value 2 (or the L signal can be detected), the control section 420 recognizes that the optical disk is a double-layer L-H medium (step S66). The control section 420 then reproduces the book version information contained in the bar code information (step S67). The control section 420 checks whether the book version read corresponds to the double-layer L-H medium (step S68). If the book version read corresponds to the double-layer L-H medium, the control section 420 activates a reproducing circuit for a double-layer L-H medium (step S69). Further, if the L signal has an intensity smaller than the reference value 2 (or the L signal cannot be detected), the control section 420 recognizes that the optical disk is a double-layer H-L medium (step S70). The control section 420 then reproduces the book version information contained in the bar code information (step S71). The control section 420 checks whether the book version read corresponds to the double-layer H-L medium (step S72). If the book version read corresponds to the double-layer H-L medium, the control section 420 activates a reproducing circuit for a double-layer H-L medium (step S73). On the other hand, when the reproduction signal intensity is initially evaluated (step D53), if the intensity of a signal from the bar code except for the bars in the BCA area is larger than the reference value, then the control section 420 determines that the optical disk is a single-layer L-H medium (step S74). As described above, for reproduction signals from the BCA, located in the innermost peripheral portion, if the rate at which a reproduction signal at a level above the reference value 1 is higher than that at which a reproduction signal at a level below the reference value 1, the control section 420 determines that the optical disk installed is a single-layer L-H. On the basis of the result of the determination, the control section 420 adjusts the gain of the amplifier of the BCA reproducing circuit 430 (step S75). The control section 420 then reproducibly reads the book version contained in the bar code information (step S76). Then, the control section 420 checks whether or not the book version matches a single-layer L-H medium (step S77). If the book version matches the single-layer L-H medium, the control section 420 activates a reproducing circuit for a single-layer L-H medium as previously described (step S78). During the above determining process, if the book version does not match the result of the determination based on the signal intensity, the flow returns to the reflection evaluation based on the reproduction signal intensity. Further, if the loop is repeated many times during the determining step, the control section 420 may output a disk recognition error to allow the disk to be removed.

Figure 16:
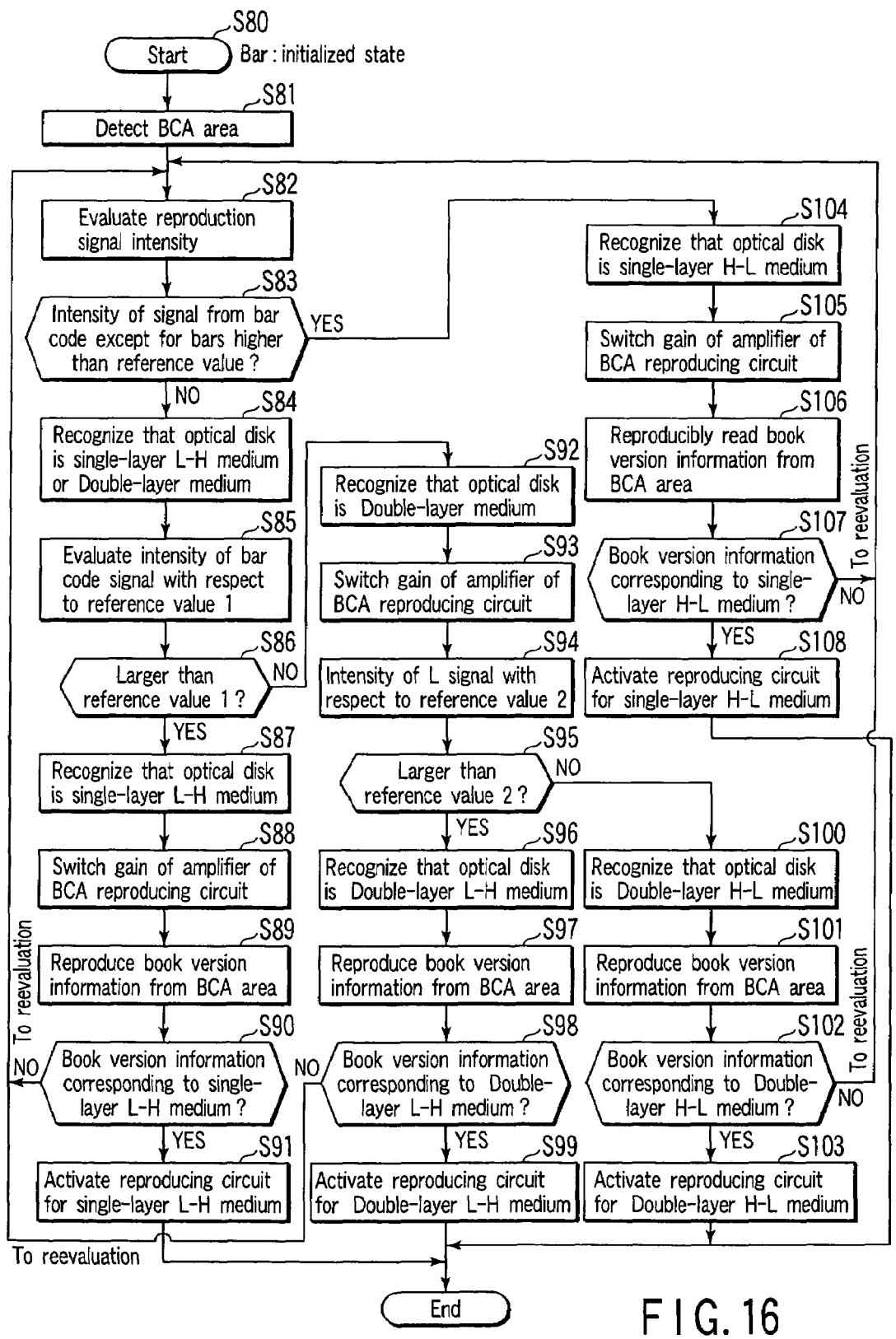
FIG. 16 is a flowchart of determinations for the single- and double-layer rewritable media and switching of the reproducing and recording circuit in which bar code information is written in the BCA area in the uninitialized state.

FIG. 16 is a flow chart of determinations made if a bar code is written, in the uninitialized state, in the BCA area of a single-layer medium. This process is basically the same as the determining step described above. However, the signal characteristics of a single-layer H-L and L-H media are inverted, so that the results of determinations for the single layer are opposite to those shown in FIG. 15. Accordingly, the detailed description of operations is omitted.

According to the preset embodiment, information can be recorded using the mixture of the four types of media, a single-layer L-H and H-L media and a double-layer H-L and L-H media. It is thus possible to select a medium having a recording film suitable for a recording purpose or application, from a group of a larger number of media. Further, the medium determination in the BCA area enables the information reproducing and recording circuit to be switched before entering the lead-in area. This allows recording speed information written in the system lead-in area to be read earlier. Therefore, set information recording at a specified speed before entering the data area. This allows the information recording circuit (the spindle motor driving circuit 415 and the like) to be quickly activated.

Figure 17:
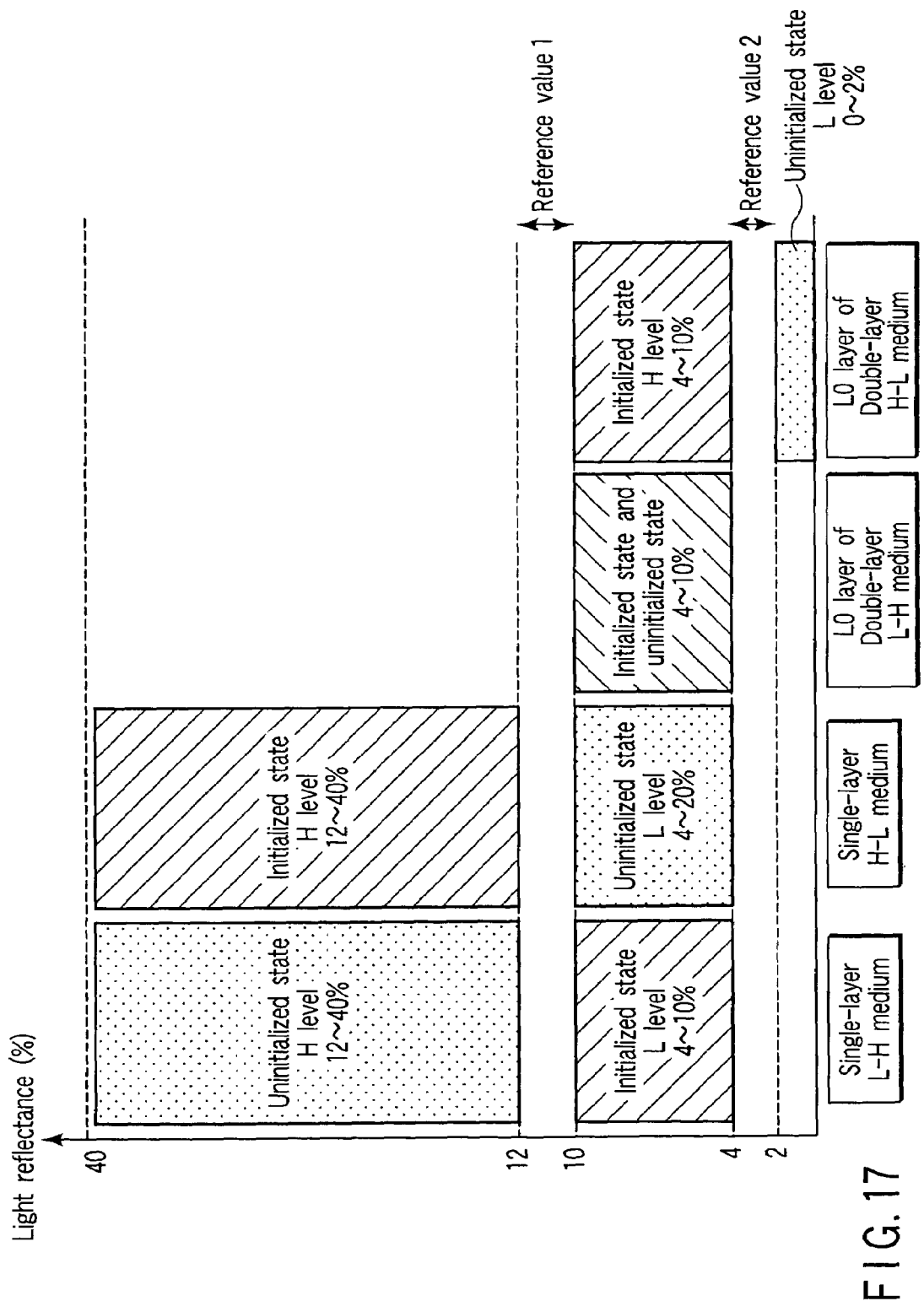
FIG. 17 is a diagram showing the reflectance ranges of the recording films of the single- and double-layer rewritable media.

With the above determining method, first, the reference value 1 must be provided in order to determine the intensities of reproduction signals from a single-layer H-L and L-H media. FIG. 17 is a diagram showing the ranges of reflectances of recording films in a single- and double-layer rewritable media. To set the reference value 1, used to evaluate the signal intensity in a first stage, it is necessary to use a medium in which the initialized state (H level) of a single-layer H-L medium does not overlap the initialized state (L level) of a single-layer L-H medium. In this case, as previously described, the reflectance of the single-layer H-L medium in the initialized state (H level) is defined as the range of 12 to 40%. The reflectance of the single-layer L-H medium in the initialized state (L level) is defined as the range of 4 to 10%. Similarly, it is only necessary that the initialized state (H level) of the L0 layer of a double-layer H-L medium and the uninitialized state (H level) of the L0 layer of a double-layer L-H medium do not overlap the initialized state (H level) of a single-layer H-L medium. Therefore, as shown in FIG. 17, the above medium determining method can be accurately executed in the BCA area when the reflectances of the L0 layer of the double-layer H-L medium in the initialized state (H level) and the L0 layer of the double-layer L-H medium in the uninitialized state (H level) are defined as the range of 4 to 10% similarly to the reflectance of the single-layer H-L medium in the initialized state (H level). In this case, the range of the reference value 1 is equal to the range of the reproduction signal intensity corresponding to a reflectance higher than 10% and lower than 12%.

The reflectance of the L0 layer of a double-layer medium with a high reproduction signal quality is about 5 to 7% as described above. This definition of the reflectance ensures the reproduction signal quality. Although determinations can be made using only the book version information, the use of a medium with a defined reflectance enables the type of the medium to be determined on the basis of the reproduction signal intensity corresponding to the reflectance. This enables the gain of the amplifier to be pre-adjusted. Consequently, errors in reading of the book version information reproduced need not substantially be taken into account. Therefore, accurate reads can be accomplished. Since the book version information read can be compared with the result of the signal intensity evaluation, very accurate medium determinations can finally be made. Further, this determining method does not include any vertical operation of the lens as in the case of a focus search; it can be accomplished simply by processing the electric signals. Therefore, very quick determinations can be made.

On the other hand, the reference value 2 is used to determine whether the optical disk is a double-layer L-H or H-L medium, that is, to compare L signals from these media. Accordingly, to provide this reference value, it is necessary that the reflectance of the double-layer L-H medium in the initialized state (L level) does not overlap the reflectance of the double-layer L-H medium in the uninitialized state (L level). It is essential to be able to detect the L signal from the L-H medium in the initialized state in order to carry out detection of addresses, focusing, and tracking. However, this does not apply to the H-L medium. The reflectance of the H-L medium at the L level is preferably as close to 0% as possible in order to improve the SN ratio and is at 2% or less. Accordingly, by defining the reflectance of the double-layer L-H medium in the initialized state (L level) as the range of 4 to 10% and defining the reflectance of the double-layer H-L medium in the uninitialized state (L level) as the range of 0 to 2%, it is possible to provide the range of the reference value 1 which is equal to the range of the reproduction signal range corresponding to a reflectance higher than 10% and lower than 12%. Consequently, a determining apparatus can be provided which uses the reference value 2 to determine whether the optical disk is a double-layer L-H or H-L medium. Actually, the signal intensity level corresponding to a detection limit corresponds to the reference value 2. The upper limit of the reflectance of the double-layer L-H medium in the initialized state is defined as 10% for the following reason: the uninitialized state corresponds to the H level and the reflectance in the uninitialized state is defined as the range of 4 to 10% in order to provide the reference value 1, so that the reflectance at the L level is always lower than that at the H level.

In the above description, medium comparisons are made using the fixed method for producing a BCA area. However, the production of a bar code in the BCA area can also be defined using the signal characteristic. Thus, provided that the reproduction signal characteristic is fixed, medium determinations can also be made using the above reference values and definitions for the reflectance of the medium reflection film. For example, existing DVDs are generally produced so that the bar portions of the bar code provide L signals. Accordingly, description will be given of a determining scheme for setting the reproduction signal characteristic such that the bar portion provides the L signal, while the bar code except for the bar portions provides the H signal.

If the bar code is written by removing the recording film, the bar portion provides the L signal, while the bar code except for the bar portions provides the H signal. Accordingly, determinations can be made using the scheme shown in FIG. 12. On the other hand, if the bar code is written on the basis of the initialized state and uninitialized state of the recording film, then for both single- and double-layer media, the bar code portion is written to the H-L medium in the uninitialized state and to the L-H medium in the initialized state in order to obtain the same reproduction signal characteristic.

Figure 18:
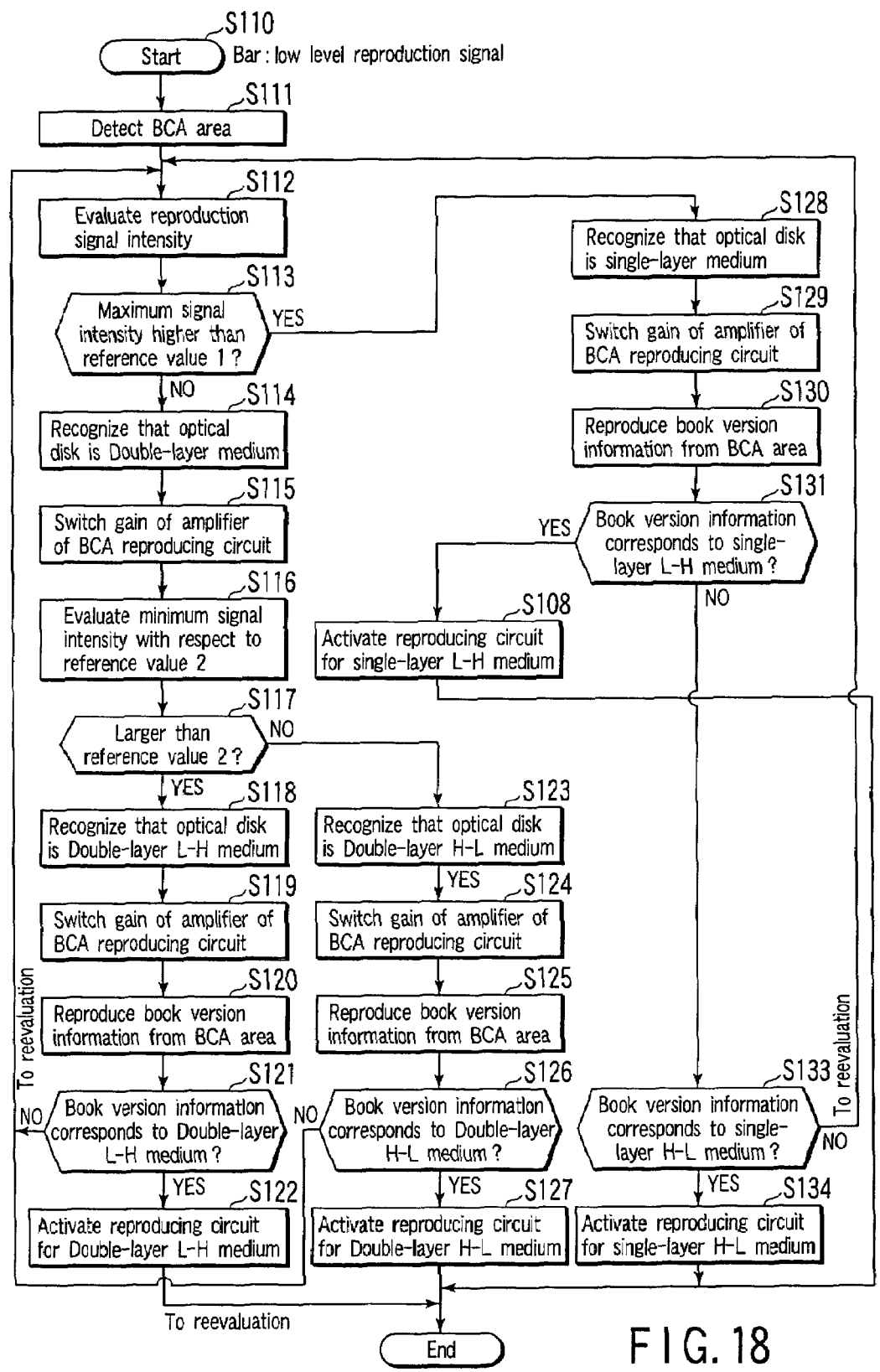
FIG. 18 is a flowchart of determinations for the single- and double-layer rewritable media and switching of the reproducing and recording circuit in which the signal characteristic of the bar code information in the BCA area is defined as an L signal.

FIG. 18 shows a determining scheme for a medium for which the bars in the bar code information are defined to provide L signals. Also in this case, the reference values 1 and 2 are used. The control section 420 starts a determining operation (step S110). The control section 420 detects the BCA (step S111) and then evaluates the reproduction signal intensity (step S112). The control section 420 first evaluates the H signal of the reproduction signal. If the H signal has an intensity smaller than the reference value 1 (NO in step S113), the control section 420 determines that the optical disk is a double-layer medium (step S114). The control section 420 adjusts the gain of the amplifier (step S115) and then evaluates the signal intensity of the L signal (step S116). If the L signal has an intensity larger than the reference value 2, the control section 420 determines that the optical disk is a double-layer L-H medium (step S118). Subsequently, the control section 420 further adjusts the amplifier gain circuit (step S119), and then reproduces the book version contained in the bar code information in the BCA area (step S120). The control section 420 then checks whether the optical disk is a double-layer L-H medium (step S121). If the result of the signal intensity evaluation matches the book version, the control section 420 activates a reproducing and recording circuit for a double-layer L-H medium as previously described (step S122). If the result of the evaluation indicates that the L signal has an intensity smaller than the reference value 2 (or the L signal cannot be detected), the control signal 420 recognizes that the optical disk is a double-layer H-L medium (step S123). The control section 420 similarly adjusts the amplifier gain circuit (step S124), and then reproduces the book version contained in the bar code information (step S125). The control section 420 then checks whether the optical disk is a double-layer H-L medium (step S126). If the result of the signal intensity evaluation matches the book version, the control section 420 activates a reproducing and recording circuit for a double-layer H-L medium as previously described (step S127). If the result of the evaluation does not match in both cases, the flow returns to the initial signal intensity evaluation. On the other hand, if the result of the evaluation indicates that the H signal has an intensity larger than the reference value 1, the control signal 420 recognizes that the optical disk is a single-layer medium (step S128). The control section 420 adjusts the amplifier gain circuit (step S129), and then reproduces the book version contained in the bar code information (step S130). The control section 420 first checks whether the optical disk is a single-layer L-H medium (step S131). If the optical disk is a single-layer L-H medium, the control section 420 activates a reproducing and recording circuit for a single-layer L-H medium (step S132). If the optical disk is not a single-layer L-H medium, the control section 420 checks whether the optical disk is a single-layer H-L medium (step S133). If the result of the evaluation matches the book version, the control section 420 activates a reproducing and recording circuit for a single-layer H-L medium (step S134). Also in this case, if the result of the evaluation does not match the book version, the flow returns to the initial signal intensity evaluation.

As described above, (1) settings are made such that the reflectance of the single-layer H-L medium in the initialized state (H level) does not overlap the reflectances of the single-layer L-H medium in the initialized state (L level), the L0 layer of the double-layer L-H medium in the uninitialized state (H level) or the L0 layer of the double-layer H-L medium in the initialized state (H level). Further, (2) the reflectance of the L0 layer of the double-layer H-L medium in the uninitialized state (L level) is set to at most the detection limit value. This makes it possible to use the mixture of the four types of media conforming to the same standard for rewritable optical disks. Further, as shown in FIG. 17, the reflectance of the single-layer H-L medium in the initialized state (H level) is defined as 12 to 40%. The reflectances of the single-layer L-H medium in the initialized state (L level), the L0 layer of the double-layer L-H medium in the uninitialized state (H level), and the L0 layer of the double-layer H-L medium in the initialized state (H level) are each defined as 4 to 10%. This makes it possible to produce a determining apparatus that meets conditions for avoiding the overlapping of the reflectances, while maintaining a high signal quality. In connection with the method and apparatus for making medium determinations, description has been given of the scheme for making determinations for all of the four types of rewritable optical disks having different recording film characteristics and layer numbers. However, the apparatus need not make determinations for all of the four types. If selection may be made from a group of a smaller number of medium types, no determining step needs to be executed on unnecessary medium types.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus in which a first, second, third, and fourth optical disks are selectively installed, the first and second optical disks having different recording film characteristics from each other and both having a single-layer recording layer, the third and fourth optical disks having different recording film characteristics from each other and both having a double-layer recording layer, the optical disk apparatus recording and reproducing information on and from the optical disk installed, the optical disk apparatus comprising:

an optical head which irradiates the optical disk installed with a light beam to provide a reproduction signal corresponding to reflected light;

a determining section which uses the optical head to reproduce information from an innermost peripheral portion of the optical disk installed to determine which of the first to fourth optical disks has been installed, on the basis of the level of a reproduction signal obtained;

a reproduction signal processing section which processes the reproduction signal provided by the optical head to extract information from the reproduction signal;

a control section which controls the reproduction signal processing section on the basis of the result of the determination by the determining section;

a section which determines that the optical disk installed is the first optical disk if a rate at which a reproduction signal at a level above a first reference value is obtained from the innermost peripheral portion is higher than a rate at which a reproduction signal at a level below the first reference value is obtained from the innermost peripheral portion;

a section which determines that one of the second to fourth disk from which a reproduction signal level higher than the first reference value is obtained is the second optical disk; and a section which determines that one of the third and fourth optical disks for which all of the reproduction signals obtained are at a signal level substantially above a second reference value smaller than the first reference value is the third optical disk.

2. The optical disk apparatus according to claim 1, wherein the determining section determines the first optical disk to be a single-layer L-H medium, the second optical disk to be a single-layer H-L medium, the third optical disk to be a double-layer L-H medium, and the fourth optical disk to be a double-layer H-L medium.

3. The optical disk apparatus according to claim 2, wherein the control section uses the optical head to reproduce information indicating the type of the optical disk itself recorded in the inner peripheral portion of the optical disk installed, and checks the information reproduced against the result of the determination by the determining section to determine which of the first to fourth optical disks has been installed.

4. The optical disk apparatus according to claim 1, wherein the determining section determines the first optical disk to be a single-layer H-L medium, the second optical disk to be a single-layer L-H medium, the third optical disk to be a double-layer L-H medium, and the fourth optical disk to be a double-layer H-L medium.

5. The optical disk apparatus according to claim 4, wherein the control section uses the optical head to reproduce information indicating the type of the optical disk itself recorded in the inner peripheral portion of the optical disk installed, and checks the information reproduced against the result of the determination by the determining section to determine which of the first to fourth optical disks has been installed.

6. The optical disk apparatus according to claim 1, wherein the control section uses the optical head to reproduce information indicating the type of the optical disk itself recorded in the inner peripheral portion of the optical disk installed, and checks the information reproduced against the result of the determination by the determining section to determine which of the first to fourth optical disks has been installed.

7. A rewritable recording medium serving as an optical disk applied to the optical disk apparatus according to claim 1 and including a double-layer L-H medium and a double-layer H-L medium, wherein an innermost peripheral portion of each of the double-layer L-H medium and the double-layer H-L medium has a BCA (Burst Cutting Area), and the range of light reflectance of an L0 layer of the double-layer L-H medium in an initialized state does not overlap the range of light reflectance of an L0 layer of the double-layer H-L medium in an uninitialized state.

8. The rewritable recording medium according to claim 7, wherein the light reflectance of the double-layer L-H medium in the initialized state is set within a range of 4 to 11%, and the light reflectance of the double-layer H-L medium in the uninitialized state is set within a range of 0 to 2%.

9. The rewritable recording medium according to claim 7, wherein the recording medium includes a single-layer L-H medium and a single-layer H-L medium, and the light reflectances of the single-layer L-H medium in the initialized state, the L0 layer of the double-layer H-L medium in the uninitialized state, and the L0 layer of the double-layer L-H medium in the uninitialized state do not overlap the light reflectance of the single-layer H-L medium in the initialized state.

10. The rewritable recording medium according to claim 9, wherein the light reflectances of the single-layer L-H medium in the initialized state and the L0 layers of the double-layer H-L medium and the double-layer L-H medium are each set at 4 to 11%, and the light reflectance of the single-layer H-L medium in the initialized state is set within a range of 12 to 40%.

11. An optical disk apparatus in which a first, second, third, and fourth optical disks are selectively installed, the first and second optical disks having different recording film characteristics from each other and both having a single-layer recording layer, the third and fourth optical disks having different recording film characteristics from each other and both having a double-layer recording layer, the optical disk apparatus recording and reproducing information on and from the optical disk installed, the optical disk apparatus comprising:

an optical head which irradiates the optical disk installed with a light beam to provide a reproduction signal corresponding to reflected light;

a determining section which uses the optical head to reproduce information from an innermost peripheral portion of the optical disk installed to determine which of the first to fourth optical disks has been installed, on the basis of the level of a reproduction signal obtained;

a section which determines that the optical disk installed is the first optical disk if a rate at which a reproduction signal at a level above a first reference value is obtained from the innermost peripheral portion is higher than a rate at which a reproduction signal at a level below the first reference value is obtained from the innermost peripheral portion;

a section which determines that one of the second to fourth disk from which a reproduction signal level higher than the first reference value is obtained is the second optical disk; and a section which determines that one of the third and fourth optical disks for which all of the reproduction signals obtained are at a signal level substantially above a second reference value smaller than the first reference value is the third optical disk.

12. The optical disk apparatus according to claim 11, wherein the determining section determines the first optical disk to be a single-layer L-H medium, the second optical disk to be a single-layer H-L medium, the third optical disk to be a double-layer L-H medium, and the fourth optical disk to be a double-layer H-L medium.

13. The optical disk apparatus according to claim 12, wherein the control section uses the optical head to reproduce information indicating the type of the optical disk itself recorded in the inner peripheral portion of the optical disk installed, and checks the information reproduced against the result of the determination by the determining section to determine which of the first to fourth optical disks has been installed.

14. The optical disk apparatus according to claim 11, wherein the determining section determines the first optical disk to be a single-layer H-L medium, the second optical disk to be a single-layer L-H medium, the third optical disk to be a double-layer L-H medium, and the fourth optical disk to be a double-layer H-L medium.

15. The optical disk apparatus according to claim 14, wherein the control section uses the optical head to reproduce information indicating the type of the optical disk itself recorded in the inner peripheral portion of the optical disk installed, and checks the information reproduced against the result of the determination by the determining section to determine which of the first to fourth optical disks has been installed.

16. A method for controlling an optical disk apparatus in which a first, second, third, and fourth optical disks are selectively installed, the first and second optical disks having different recording film characteristics from each other and both having a single-layer recording layer, the third and fourth optical disks having different recording film characteristics from each other and both having a double-layer recording layer, the method comprising:

reproducing information from an innermost peripheral portion of one of the first to fourth optical disks which has been installed, to provide a reproduction signal;

determining which of the first to fourth optical disks has been installed, on the basis of the level of the reproduction signal;

controlling a signal processing section for reproducing information, on the basis of a result of the determination;

determining that the optical disk installed is the first optical disk if a rate at which a reproduction signal at a level above a first reference value is obtained from the innermost peripheral portion is higher than a rate at which a reproduction signal at a level below the first reference value is obtained from the innermost peripheral portion;

determining that one of the second to fourth disk from which a reproduction signal level higher than the first reference value is obtained is the second optical disk; and determining that one of the third and fourth optical disks for which all of the reproduction signals obtained are at a signal level substantially above a second reference value smaller than the first reference value is the third optical disk.

* * * * *